(12) United States Patent
Moskovchenko et al.

(10) Patent No.: US 11,193,214 B2
(45) Date of Patent: Dec. 7, 2021

(54) METHOD AND APPARATUS FOR RECOVERY OF NOBLE METALS, INCLUDING RECOVERY OF NOBLE METALS FROM PLATED AND/OR FILLED SCRAP

(71) Applicant: Greene Lyon Group, Inc., Beverly, MA (US)

(72) Inventors: Svitlana Moskovchenko, Montreal (CA); Andre Brosseau, Montreal (CA)

(73) Assignee: Greene Lyon Group, Inc., Beverly, MA (US)

( * ) Notice: Subject to any disclaimer, the term of this patent is extended or adjusted under 35 U.S.C. 154(b) by 0 days.

(21) Appl. No.: 16/418,592

(22) Filed: May 21, 2019

(65) Prior Publication Data
US 2020/0040475 A1  Feb. 6, 2020

Related U.S. Application Data

(63) Continuation of application No. 15/106,013, filed as application No. PCT/US2014/071419 on Dec. 19, 2014, now abandoned.
(Continued)

(51) Int. Cl.
*C25C 1/20* (2006.01)
*C25C 7/06* (2006.01)
(Continued)

(52) U.S. Cl.
CPC ............... *C25C 1/20* (2013.01); *C25B 1/28* (2013.01); *C25B 1/29* (2021.01); *C25B 1/30* (2013.01);
(Continued)

(58) Field of Classification Search
None
See application file for complete search history.

(56) References Cited

U.S. PATENT DOCUMENTS 1,335,277 A    3/1920 De Golyer et al.
2,185,858 A    1/1940 Mason
(Continued)

FOREIGN PATENT DOCUMENTS

CN         1925915 A       3/2007
CN       101082080 A      12/2007
(Continued)

OTHER PUBLICATIONS

Gijsemans et al, Recovery of rare earths from the green lamp phosphor LaPO4:Ce3+,Tb3+ (LAP) by dissolution in concentrated methanesulphonic acid, RSC Advances, vol. 8, Issue 46, Jul. 2018, pp. 26349-26355 (Year: 2018).*
(Continued)

*Primary Examiner* — Harry D Wilkins, III
(74) *Attorney, Agent, or Firm* — Wolf, Greenfield & Sacks, P.C.

(57) ABSTRACT

Systems and methods for the recovery of noble metal from noble-metal-containing material are generally described. Certain embodiments related to systems and methods in which an electric current is transported between an electrode and the noble metal of a noble-metal-containing material to dissolve at least a portion of the noble metal from the noble-metal-containing material. The dissolved noble metal can subsequently be precipitated out of solution and recovered, according to certain embodiments. Noble metals can be recovered from any suitable noble-metal-containing material, including plated and/or filled scrap materials and/ or other materials.

27 Claims, 8 Drawing Sheets

Related U.S. Application Data

(60) Provisional application No. 61/944,897, filed on Feb. 26, 2014, provisional application No. 61/919,312, filed on Dec. 20, 2013.

(51) Int. Cl.
  *C25B 1/29*   (2021.01)
  *C25B 9/17*   (2021.01)
  *C25B 1/28*   (2021.01)
  *C25B 1/30*   (2006.01)
  *C25B 15/08*  (2006.01)

(52) U.S. Cl.
  CPC .............. *C25B 9/17* (2021.01); *C25B 15/08* (2013.01); *C25C 7/06* (2013.01); *Y02P 10/20* (2015.11)

(56) References Cited

U.S. PATENT DOCUMENTS

| | | | |
|---|---|---|---|
| 2,574,620 | A | 11/1951 | Carlsson |
| 2,607,721 | A | 8/1952 | Holman |
| 2,794,829 | A | 6/1957 | Van Der Waarden et al. |
| 3,616,332 | A | 10/1971 | Miller et al. |
| 3,788,958 | A | 1/1974 | Dillenberg |
| 3,935,005 | A | 1/1976 | Solidum et al. |
| 4,056,450 | A | 11/1977 | McCauslan |
| 4,078,918 | A | 3/1978 | Perman |
| 4,229,270 | A | 10/1980 | Subramanian et al. |
| 4,374,008 | A | 2/1983 | Natansohn et al. |
| 4,426,225 | A | 1/1984 | Ida et al. |
| 4,456,473 | A | 6/1984 | Jost |
| 4,456,474 | A | 6/1984 | Jost |
| 4,606,797 | A | 8/1986 | Taylor et al. |
| 4,663,005 | A | 5/1987 | Edson |
| 4,678,552 | A | 7/1987 | Chen |
| 5,098,534 | A | 3/1992 | Nakamura et al. |
| 5,433,893 | A | 7/1995 | Jost et al. |
| 5,491,247 | A | 2/1996 | Gernon |
| 5,728,854 | A | 3/1998 | Chen et al. |
| 5,846,288 | A | 12/1998 | Jost et al. |
| 5,963,772 | A | 10/1999 | Jost et al. |
| 6,129,779 | A | 10/2000 | Bohland et al. |
| 6,767,447 | B2 | 7/2004 | Uno et al. |
| 6,783,690 | B2 | 8/2004 | Kologe et al. |
| 6,790,338 | B2 | 9/2004 | Kinstle et al. |
| 6,986,192 | B2 | 1/2006 | Fitch |
| 7,166,145 | B1 | 1/2007 | Han |
| 7,635,534 | B2 | 12/2009 | Shore et al. |
| 7,972,413 | B2 | 7/2011 | Xia |
| 8,211,287 | B2 | 7/2012 | Kato et al. |
| 8,317,896 | B2 | 11/2012 | Homma et al. |
| 8,709,277 | B2 | 4/2014 | Takahashi et al. |
| 8,722,609 | B2 | 5/2014 | Choczaj et al. |
| 8,728,253 | B2 | 5/2014 | Fassbender et al. |
| 9,090,985 | B2 | 7/2015 | Hsu |
| 9,238,850 | B2 | 1/2016 | Korzenski et al. |
| 9,518,327 | B2 | 12/2016 | Hsu et al. |
| 2004/0173057 | A1 | 9/2004 | Fairbourn |
| 2005/0139488 | A1 | 6/2005 | Ogihara et al. |
| 2006/0166847 | A1 | 7/2006 | Walker et al. |
| 2007/0183951 | A1 | 8/2007 | Nakatsu et al. |
| 2008/0269096 | A1 | 10/2008 | Visintin et al. |
| 2009/0226352 | A1 | 9/2009 | Hsu et al. |
| 2009/0272227 | A1 | 11/2009 | Creasey et al. |
| 2009/0321272 | A1 | 12/2009 | Kato et al. |
| 2010/0154835 | A1 | 6/2010 | Dimeo et al. |
| 2010/0314242 | A1 | 12/2010 | Lee et al. |
| 2011/0017020 | A1 | 1/2011 | Homma et al. |
| 2011/0028306 | A1 | 2/2011 | Variabel et al. |
| 2012/0036962 | A1 | 2/2012 | Yun et al. |
| 2012/0090433 | A1 | 4/2012 | Butler |
| 2012/0169997 | A1 | 7/2012 | Iwaki et al. |
| 2012/0274008 | A1 | 11/2012 | Akridge |
| 2012/0292201 | A1 | 11/2012 | Hsu |
| 2012/0328494 | A1 | 12/2012 | Dreisinger et al. |
| 2013/0276284 | A1 | 10/2013 | Brosseau et al. |
| 2013/0336857 | A1 | 12/2013 | Korzenski et al. |
| 2014/0243249 | A1 | 8/2014 | Hsu |
| 2015/0376735 | A1 | 12/2015 | Hsu |
| 2016/0102408 | A1 | 4/2016 | Hsu |
| 2016/0319444 | A1 | 11/2016 | Moskovchenko et al. |
| 2016/0362804 | A1* | 12/2016 | Chen ................. C22B 11/04 |
| 2017/0058379 | A1 | 3/2017 | Norkett et al. |
| 2017/0101699 | A1 | 4/2017 | Moskovchenko et al. |
| 2018/0112289 | A1 | 4/2018 | Foley et al. |
| 2018/0230571 | A1 | 8/2018 | Willcox |
| 2018/0312985 | A1 | 11/2018 | Moskovchenko et al. |
| 2020/0048734 | A1 | 2/2020 | Moskovchenko et al. |
| 2021/0180199 | A1 | 6/2021 | Moskovchenko et al. |

FOREIGN PATENT DOCUMENTS

| | | | | |
|---|---|---|---|---|
| CN | 101392325 A | | 3/2009 | |
| CN | 102939396 A | | 2/2013 | |
| CN | 103468969 A1 | | 12/2013 | |
| EP | 0 363 314 A1 | | 4/1990 | |
| GB | 934850 | * | 8/1963 | ............. C25F 7/00 |
| JP | S49-37496 B1 | | 10/1974 | |
| JP | H08-041676 A | | 2/1996 | |
| JP | H11-302626 A1 | | 11/1999 | |
| WO | WO 99/45158 A1 | | 9/1999 | |
| WO | WO 02/42503 A1 | | 5/2002 | |
| WO | WO 2009/094732 A1 | | 8/2009 | |
| WO | WO 2011/024164 A1 | | 3/2011 | |
| WO | WO 2011/030622 A1 | | 3/2011 | |
| WO | WO 2011/130622 A1 | | 10/2011 | |
| WO | WO 2011/154607 A1 | | 12/2011 | |
| WO | WO 2012/024603 A2 | | 2/2012 | |
| WO | WO 2012/048079 A2 | | 4/2012 | |
| WO | WO 2013/090517 A1 | | 6/2013 | |
| WO | WO 2013/152260 A1 | | 10/2013 | |
| WO | WO 2015/130965 A1 | | 9/2015 | |
| WO | WO 2016/210051 A1 | | 12/2016 | |

OTHER PUBLICATIONS

Office Communication for U.S. Appl. No. 16/389,009 dated Apr. 28, 2020.

Office Communication for CN App. No. 201680048698.1 dated Nov. 29, 2019.

Gromov et al., The extraction of silver from silver containing scrap. Zhurnal Prikladnoi Khimii. Jul. 1998;71(7):1067-70.

Extended European Search Report for EP App. No. 14871936.2 dated Aug. 2, 2017.

Intention to Grant for EP App. No. 14871936.2 dated Feb. 6, 2019 and allowed claims.

International Search Report and Written Opinion for PCT/US14/71419 dated Jun. 11, 2015.

International Preliminary Report on Patentability for PCT/US14/71419 dated Jun. 30, 2016.

Office Communication for CN App. No. 201580010231.3 dated Mar. 1, 2017.

Office Communication for CN App. No. 201580010231.3 dated Feb. 24, 2018.

Supplementary Partial European Search Report for EP App. No. 15754631.8 dated Jan. 31, 2018.

Extended European Search Report for EP App. No. 15754631.8 dated Jul. 17, 2018.

Office Communication for JP App. No. 2016-554262 dated Nov. 12, 2018.

Office Communication for U.S. Appl. No. 15/121,974 dated Oct. 19, 2018.

International Search Report and Written Opinion for PCT/US15/17821 dated May 28, 2015.

International Preliminary Report on Patentability for PCT/US15/17821 dated Sep. 9, 2016.

Office Communication for CN App. No. 201680048698.1 dated Nov. 26, 2018.

(56) References Cited

OTHER PUBLICATIONS

Invitation to Pay Additional Fees for PCT/US16/38896 dated Sep. 13, 2016.
International Search Report and Written Opinion for PCT/US16/38896 dated Nov. 7, 2016.
International Preliminary Report on Patentability for PCT/US16/38896 dated Jan. 4, 2018.
[No Author Listed], Eco-Goldex Internet Home Page. Quebec, Canada. Available Aug. 31, 2016. Last accessed Mar. 3, 2017 from <http://www.eco-goldex.com/>. 2 pages.
[No Author Listed], Lutropur MSA, Lutropur MSA 100. The "green" acid for use in cleaners. BASF, EMV 0113-00 e08. 2008 . 16 pages.
[No Author Listed], Revolutionary New Processes for Stripping Precious Metals. Greene Lyon Group Press Release. Aug. 2014. 3 pages.
[No Author Listed], UWin Nanotech Co., Ltd. Internet Home Page. Taiwan. Available Nov. 9, 2012. Last accessed Mar. 3, 2017 from <http://uwin-nano.com/>. 1 page.
Gernon et al., Environmental benefits of methanesulfonic acid: Comparative properties and advantages. Green Chem. Jun. 1999:127-40.
Lin et al., Electrochemical stripping of gold from Au—Ni—Cu electronic connector scrap in an aqueous solution of thiourea. Journal of Applied Electrochemistry. Feb. 1994;24(2):157-65.
Wang et al., Process for Recovering Silver form Copper-based Silver Plated Scrap and Copper-based Silver-containing Electrical Contact Scrap. China Materials Recycling. Dec. 1998;5:14-7.
Zhang et al., Study of Gold Leaching from PCB by Thiocyanate Process. Precious Metals. Feb. 2008;29(1):11-4.
Office Communication for CN Application No. 201811343268.X dated May 6, 2020.
Office Communication for CN Application No. 201680048698.1 dated May 18, 2020.
Decision to Grant for EP Application No. 14871936.2 dated Jul. 2, 2020.
Office Communication for U.S. Appl. No. 16/389,009 dated Dec. 21, 2020.
Office Communication for EP App. No. 16815255.1 dated Oct. 1, 2020.
Office Communication for U.S. Appl. No. 15/738,333 dated Jan. 26, 2021.
Office Communication for EP Application No. 15754631.8 dated May 27, 2021.
Office Communication for U.S. Appl. No. 16/389,009 dated Jul. 7, 2021.
Notice of Allowance for U.S. Appl. No. 15/738,333 dated May 7, 2021.

* cited by examiner

METHOD AND APPARATUS FOR RECOVERY OF NOBLE METALS, INCLUDING RECOVERY OF NOBLE METALS FROM PLATED AND/OR FILLED SCRAP

RELATED APPLICATIONS

This application is a continuation of U.S. patent application Ser. No. 15/106,013, filed Jun. 17, 2016, and entitled "Method and Apparatus for Recovery of Noble Metals, Including Recovery of Noble Metals from Plated and/or Filled Scrap," which is a U.S. National Stage Entry of International Patent Application No. PCT/US2014/071419, filed Dec. 19, 2014, and entitled "Method and Apparatus for Recovery of Noble Metals, Including Recovery of Noble Metals from Plated and/or Filled Scrap," which claims priority under 35 U.S.C. § 119(e) to U.S. Provisional Patent Application Ser. No. 61/919,312, filed Dec. 20, 2013, and entitled "Method and Apparatus for Recovery of Noble Metals, Including Recovery of Noble Metals from Plated and/or Filled Scrap," and U.S. Provisional Patent Application Ser. No. 61/944,897, filed Feb. 26, 2014, and entitled "Method and Apparatus for Recovery of Noble Metals, Including Recovery of Noble Metals from Plated and/or Filled Scrap," each of which is incorporated herein by reference in its entirety for all purposes.

TECHNICAL FIELD

The recovery of noble metals from noble-metal-containing materials, and related systems and apparatuses, are generally described.

BACKGROUND

Many scrap materials contain noble metals, for example, coated on the scrap or contained within the bulk of the scrap. Concentrating and recovering such noble metal(s) from the scrap material could provide a substantial source of revenue. Removal of metal coatings is an operation that has been used in metal finishing processes. In the recycling industry, it is often desired to separate noble-metal-containing coatings from an underlying substrate, so that the material of a coating and the material of a substrate may be recycled separately. Previous processes have employed many different chemical solutions to oxidize and dissolve noble metals. These solutions are normally even more aggressive to base, non-noble metals, and therefore dissolve base metals of the substrate faster than they dissolve noble metals. The use of such solutions (e.g., Aqua Regia to strip gold from a base metal substrate and nitric acid to strip silver from a base metal substrate) will generally lead to the complete dissolution of both the coating and the substrate. When the substrate's weight is much higher than the weight of the noble-metal-containing coating, complete dissolution is particularly undesirable, as the resulting leaching solutions will be loaded mainly with base metals rather than noble metals.

Accordingly, systems and methods which would allow one to selectively remove noble metals from noble-metal-containing materials, would be desirable.

SUMMARY

Systems and methods for the recovery of noble metal from noble-metal-containing material are generally described. Certain embodiments relate to systems and methods in which an electric current is transported between the noble metal of a noble-metal-containing material and a counter electrode to dissolve at least a portion of the noble metal from the noble-metal-containing material. The dissolved noble metal can subsequently be precipitated out of solution and recovered, according to certain embodiments. Noble metals can be recovered from any suitable noble-metal-containing material, including plated and/or filled scrap materials and/or other materials. The subject matter of the present invention involves, in some cases, interrelated products, alternative solutions to a particular problem, and/or a plurality of different uses of one or more systems and/or articles.

In one aspect, a system for recovering noble metals from a noble metal-containing material is described. The system comprises, according to some embodiments, an electrode, a noble-metal containing material, and an electrolytic solution comprising a sulfonic acid. In some such embodiments, the system is configured such that, when an electric current is transported between the electrode and the noble metal, the noble metal is removed from the noble metal-containing material. In some such embodiments, the electrolytic solution can contain persulfuric acid, in addition to or in place of the sulfonic acid.

In certain embodiments, the system comprises an electrode, a noble-metal containing material, and an electrolytic solution, wherein the system is configured such that, when an electric current is transported between the electrode and the noble metal, the noble metal is removed from the noble metal-containing material, and the bulk of the electrolytic solution is substantially free of a supplemental noble metal oxidant.

Certain aspects relate to a method for recovering a noble metal from a noble-metal-containing material. In some embodiments, the method comprises transporting an electric current between an electrode and a noble metal of the noble-metal-containing material positioned within an electrolytic solution comprising a sulfonic acid such that at least a portion of the noble metal is removed from the noble-metal-containing material. In some such embodiments, the electrolytic solution can contain persulfuric acid, in addition to or in place of the sulfonic acid.

In some embodiments, the method comprises transporting an electric current between an electrode and a noble metal of the noble-metal-containing material positioned within an electrolytic solution that is substantially free of a supplemental noble metal oxidant such that at least a portion of the noble metal is removed from the noble-metal-containing material.

According to certain embodiments, a process for the recovery of noble metals from noble metal containing material (e.g., plated/filled scrap items and the like) is described. The process can be an electrolytic process, according to certain embodiments. For example, certain embodiments relate to systems and methods for removing noble metal from noble-metal-containing materials by immersing the noble-metal-containing materials in an electrolytic solution. In some such embodiments, an electric potential can be applied between the noble-metal-containing material (which can serve as an anode), and a counter electrode (which can serve as a cathode). In some such embodiments, application of the electric potential can cause the noble metal(s) to be at least partially removed from the noble-metal-containing material.

Certain embodiments relate to a system for the recovery of noble metal from noble metal containing material. In some embodiments, the system comprises a rotatable container positioned within a vessel configured to contain an electrolytic liquid; and an electrically conductive pathway configured such that, when the noble metal containing material is contained within the rotatable container, the electrically conductive pathway remains in electrical communication with the noble metal containing material when the container is rotated.

Any suitable type of noble-metal-containing material can be used. The noble-metal containing material can, in some embodiments, comprise an underlying substrate material (e.g., a base metal and/or metal alloy), which can contain less noble metals and/or metals alloys than the noble metal(s) that have been targeted for removal. In some embodiments, the substrate can be at least partially covered with a layer (e.g., a film or a foil or a layer) containing noble metal(s) (e.g., containing pure noble metals or noble metals alloys). Noble metal(s) could also be present as a filling, in addition to or in place of the noble metal(s) contained within an overlying layer. The noble metals/metals alloys of the layer and/or filling can be recovered as a pure noble metal (e.g., if the plating is made of a pure noble metal), or as a mixture of noble metals, optionally with a base metal(s) and/or base metals salt(s). In certain embodiments, the concentration of the noble metal in the recovered metal is higher than or equal to the concentration of the noble metals in the filling/plating.

Certain aspects relate to methods for concentrating noble metals. In some such embodiments, noble metal containing items serve as an input material. In some such embodiments, a material is recovered (e.g., as a plating, filling, particles, etc.) containing noble metal(s) present in concentrated form.

Certain embodiments are related to systems and methods for the recovery of a substrate metal(s) and/or substrate metal alloy(s) (e.g., metals and/or metal alloys that are less noble than the noble metal targeted for removal). Any type of substrate material (e.g., conductive material and/or non-conductive material) can be recovered. In some such embodiments, the substrates have metallic parts containing noble metals (e.g., as a coating and/or as a filler). The substrate can be used as an anode in various of the electrolysis processes described herein. Upon application of the electrical potential, at least a portion of the noble metal(s) material can be removed. In certain cases, the noble metal material can be removed while causing little or no damage to the substrate. In certain embodiments, metals from the substrate (and/or the substrate itself) are recovered in "as is" form. This can help avoid additional expense associated with the recovery of base metals from substrates.

Certain aspects are related to a composition of an electrolytic bath. According to certain embodiments, the electrolytic bath can be safely used, thus allowing one to perform relatively easy separation of noble metal(s) from noble-metal-containing materials, and relatively easy recovery of noble metal(s) by simple filtration of the electrolyte. The chemical dissolution of the noble-metal-containing materials (e.g., plating and/or filling), which normally requires application of harsh chemicals, can be avoided, according to certain embodiments.

Certain aspects relate to systems and apparatuses in which the removal of noble metal(s) from noble-metal-containing materials is accomplished.

Certain of the systems and methods described herein provide a rapid, effective, and/or low-cost process (which can be, according to certain embodiments, characterized by very slow degradation of the electrolytic bath), whereby the bath solution can be re-used for removing noble metal(s) from additional noble-metal-containing materials.

In certain embodiments, the electrolytic solution can be recycled. In some such embodiments, the dissolution of non-noble metal(s) of the substrate will be minimal, and thus, the concentration of the such metals will be substantially absent from subsequent stripping cycles.

The systems and methods described herein can be, according to certain embodiments, green and environmentally friendly. Certain embodiments employ non-toxic and/or non-hazardous electrolytic bath compositions, the application of which does not lead to creation of substantial amounts of hazardous emissions, liquid effluents, and/or dangerous byproducts.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
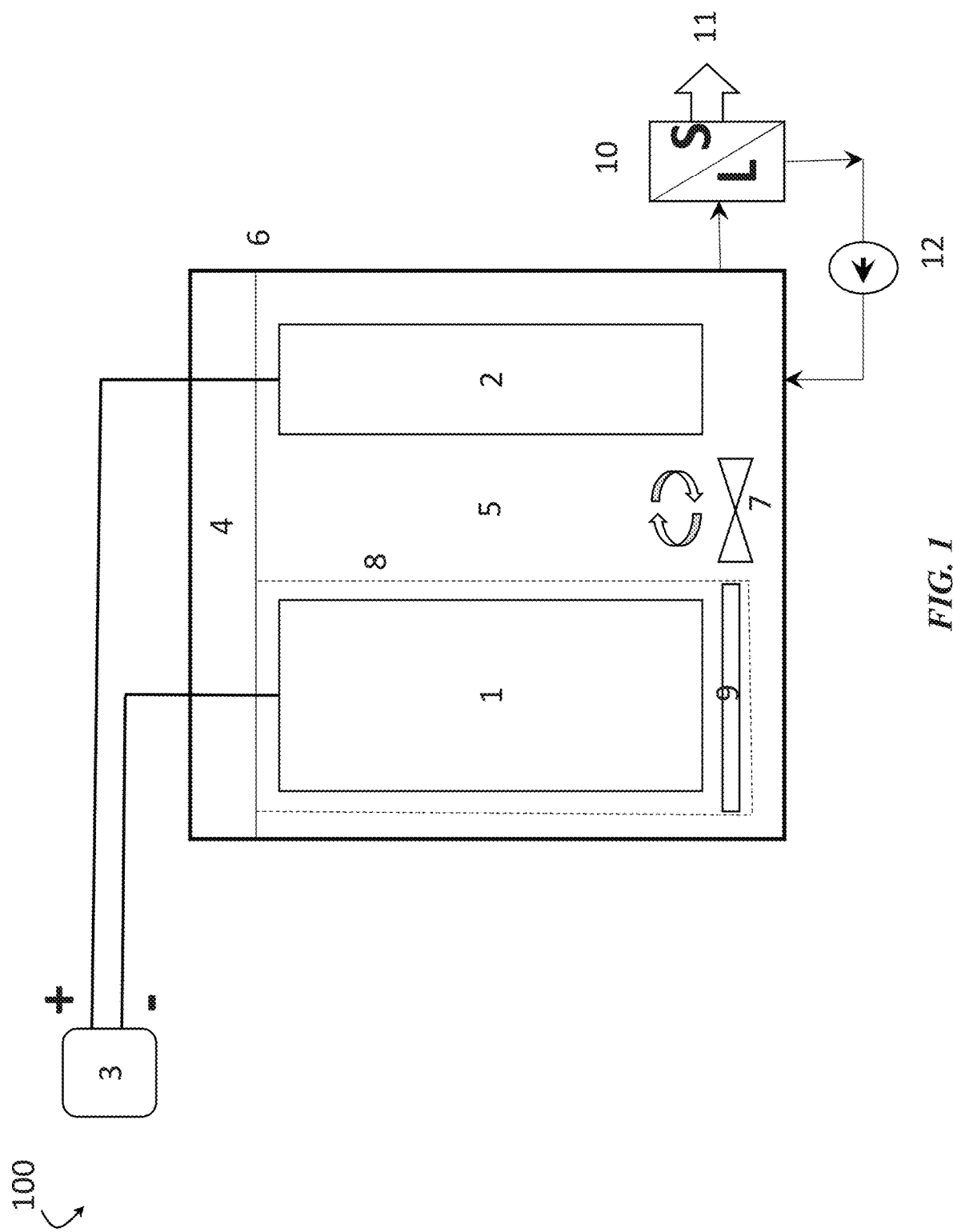
FIG. 1 is a schematic diagram of an apparatus for the electrolytic recovery of noble metal from noble-metal-containing material, according to certain embodiments.

Systems and methods for the recovery of noble metal from noble-metal-containing material are generally described. In certain embodiments, electric current is transported between the noble metal of a noble-metal-containing material and a counter electrode to remove, for example by dissolving, at least a portion of the noble metal from the noble-metal-containing material. According to some embodiments, the dissolved noble metal can subsequently be precipitated out of solution and recovered.

According to certain embodiments, compositions and processes are provided for the recovery of noble metal(s) by removing the noble metal(s) from a noble-metal-containing material. For example, in some embodiments, the noble metal(s) can be removed from a coating (e.g., a coating made of a noble metal or noble metal alloy) disposed over the surface of a substrate and/or from a filling disposed within a substrate. The substrate can be made of, for example, base metals, metals less noble than the metals of the coating and/or filler, alloys of base metal(s) and noble metal(s), and/or non-metallic material (e.g., conducting and/or non-conducting non-metallic material). According to certain embodiments, the substrate contains noble metals in a concentration lower than that contained in the coating and/or filler. In some embodiments, the noble-metal-containing material can be used as an electrode (e.g., as the anode) in an electrolytic process. This can be achieved by using the noble-metal-containing material directly as an electrode and/or by bringing the noble-metal containing material into contact with a conductive material being used as part of the electrode.

As noted above, any suitable type of noble-metal-containing material can be used. In certain embodiments, the noble metal of the noble-metal-containing material comprises gold, silver, platinum, palladium, and/or alloys of these.

In some embodiments, the noble-metal-containing material comprises at least one material that is not a noble metal (also referred to herein as a non-noble metal material). For example, in some embodiments, the noble-metal-containing material also includes one or more base metals, in addition to the noble metal within the noble-metal-containing material. In some embodiments, the base metal(s) of the noble-metal-containing material comprise copper, zinc, iron, nickel, lead, tin, aluminum, antimony, manganese, magnesium, titanium, and/or combinations of these. In some embodiments, the base metal(s) of the noble-metal-containing material comprise copper, zinc, iron, nickel, lead, and/or combinations of these.

According to certain embodiments, the noble-metal-containing material comprises a substrate and a layer comprising a noble metal over the substrate. The substrate comprises, according to some embodiments, an electronically conductive material (e.g., one or more base metals). In certain embodiments, the substrate comprises an electronically non-conductive material and/or a semiconductor material. For example, the noble-metal containing material can, in some embodiments, comprise an underlying substrate material (e.g., a base metal and/or metal alloy), which can contain less noble metals and/or metals alloys than the noble metal(s) that have been targeted for removal. In some embodiments, the substrate can be at least partially covered with a layer (e.g., a film or a foil or a layer) containing noble metal(s) (e.g., containing pure noble metals or noble metals alloys). In some embodiments, the substrate comprises a metal and/or metal alloy that is less noble than the metal and/or metal alloy contained in the layer over the substrate. Noble metal(s) could also be present as a filling, in addition to or in place of the noble metal(s) contained within an overlying layer.

As noted above, the noble metal within the noble-metal-containing material can be present as a plating, a filling, and/or a layer of a noble metal/noble metals alloys. For example, the noble metal in the noble-metal-containing material may have been applied to an underlying substrate as part of an electroplating process, by sintering, by pulverization, by mechanical joining, and the like. The substrate can comprise any type of conducting material (e.g., as a pure base metal, base metal alloy, and/or less noble metal/metal alloy). The substrate may, in some embodiments, have a complex structure and include conductive and non-conductive layers, or any type of generally non-conductive materials. The substrate may, in some embodiments, have metallic parts containing noble metals (e.g., as a coating), which can, in some embodiments, be brought in contact with the conducting surface serving as the anode in the electrolytic process. For example, the substrate may include pins made of the base metals alloy, coated with gold. Other examples of materials which can be treated using certain of the methods described herein include scrap gold/silver/gold-silver alloy plated copper wires, all types of carat gold plated silver jewelry, all types of carat gold plated base metals jewelry, silver plated ware and the like.

Noble metal can be separated from the rest of the noble-metal-containing material and collected. In certain embodiments, the system comprises a separator (e.g., a solid-liquid separator) configured to at least partially separate the noble metal removed from the noble-metal-containing material from the electrolytic solution. In some such embodiments, the noble metal(s) are recovered separately from the less noble substrate. In certain embodiments, the substrate can also be recuperated. The noble metal coatings and/or fillings can contain noble metals in higher concentration than the rest of the feed material. In addition, the recovered noble metals can have, according to certain embodiments, a purity equal to or higher than the coating and/or filling. Thus, certain of the processes described herein can result in the formation of a product including noble metal(s) at a concentration higher than the original noble-metal-containing material.

Some embodiments comprise recovering a noble metal at a concentration higher than its concentration in the noble-metal-containing material. For example, in certain embodiments, the concentration of the noble metal in the recovered metal is higher than or equal to the concentration of the noble metals in the filling/plating.

In embodiments in which the coating is made of a substantially pure noble metal (e.g., as in the case of gold or silver plated copper wires), the noble metal can be recovered in its pure form. Some such embodiments leave behind pure copper wires, which can be used as a source of pure copper metal. If the coating is made of impure noble metal (e.g., as in an 18K gold filling on the surface of a brass piece of jewelry), the coating can be removed and the noble metal will be recovered in a higher concentration than it was present in the original noble-metal-containing material. In certain embodiments, the substrate (e.g., a brass substrate) will not be corroded or otherwise substantially affected by the electrolytic procedure. In some such embodiments, the substrate can be also recovered and, in certain embodiments, recycled as a source of base metal(s). In certain embodiments, the metals of the substrate are not substantially dissolved in the electrolytic solution during the process. This, in some such embodiments, the stripping allows one to recover the metals of the substrate are "as is", and in some instances, without additional processing costs.

In certain embodiments, the noble-metal-containing material serves as an electrode (e.g., an anode) in an electrolytic process, in which the noble metal(s) is stripped from the noble-metal-containing material. In some embodiments, a single noble-metal-containing material is treated, while in other cases, multiple noble-metal-containing materials are treated simultaneously. If only one noble-metal-containing material is being treated, it can be directly attached to the positive pole of a direct current source. If there are several noble-metal-containing items, they can be arranged such that an electric contact is maintained between them. In other words, in some such embodiments, the entire group of the noble-metal-containing items to be de-plated should be electrically conductive. This can be achieved, for example, by having one of the noble-metal-containing items attached to a positive pole, and at the same time, positioning the remaining items such that they contact each other or are otherwise electronically connected to each other in such a way that they form an electrically conductive chain of items so that the electric current can pass through the entire group. If the noble-metal-containing items are sufficiently small, they can be placed in an electrically conductive container (e.g., a basket made of titanium or another metal), and the conductive container can be connected to a positive pole. In such embodiments, the items can be arranged to touch each other and the conductive container, so that the entire group of items placed in the conductive container remains electrically conductive and in electrical communication with to the positive pole. If the items are generally non-conductive, but contain conductive parts, these items can be arranged such that the conductive parts are in electrical communication with the positive pole of the voltage source.

The counter electrode (which can serve as the cathode during operation) in the electrolytic system can be made of any suitable electrically conductive material. The electrically conductive material in the counter electrode (e.g., cathode) can be in any form, such as a rod, a plate, a net, etc. The counter electrode can be connected to the negative pole. The positive and the negative poles can each be connected to the corresponding contact of a voltage source, such as a power supply. The noble-metal-containing material (which can act as an anode) and the counter electrode (which can act as a cathode) can be immersed in an electrolytic solution, for example, within a vessel. In some embodiments, the noble-metal-containing material and the counter electrode are immersed in the electrolytic solution such that the entire surface of the noble-metal-containing material is immersed in the electrolytic solution. The noble-metal-containing material can be of any shape and size. Generally, the noble metal(s) that one desires to remove should be accessible to the electrolytic solution, either directly (e.g., on the surface of the noble-metal-containing material) or indirectly (e.g., via a pathway that extends through noble metal material that has not yet been removed).

The noble-metal-containing material (which can act as an anode), the counter electrode (which can act as a cathode), a voltage source, and the electrolytic solution can form an electrolytic cell. When the voltage is applied, electric current can pass through each element of the cell. According to certain embodiments, an electric current is transported between the counter electrode and the noble metal of the noble-metal-containing material, and noble metal is removed from the noble metal-containing material.

One factor that can be important in influencing the reaction rate is re-circulation of the electrolyte inside the system. According to certain embodiments, the electrolytic solution can be recirculated to facilitate and/or speed up the electrolytic process.

FIG. 1 is a schematic illustration of an electrolytic system for the recovery of noble metal(s) from a noble-metal-containing material. Electrolytic system 100 comprises counter electrode 1, which can be used as a cathode during operation of electrolytic system 100. Electrolytic system 100 also comprises noble-metal-containing material 2 (which can be used as an anode during operation of system 100). Electrode 1 and noble-metal-containing material 2 can be connected to voltage source 3. Voltage source 3 may be, for example, a source of direct current. During operation, electrode 1 and noble-metal-containing material 2 can be immersed into vessel 4, which can contain electrolytic solution 5. In FIG. 1, line 6 is drawn to indicate the level of electrolytic solution 5.

The counter electrode (e.g., electrode 1 in FIG. 1) can be made of a variety of suitable materials. In some embodiments, the electrode comprises a metal. For example, electrode 1 can be made of a conductive metal. In certain embodiments, electrode 1 can be substantially inert to the electrolytic solution. The noble-metal-containing material (from which the noble metal(s) is desired to be removed), can serve as the anode. The noble-metal-containing material can be connected to the voltage source directly (e.g., serving as an anode itself), or it can be placed in a conductive container (e.g., a basket). In some embodiments, the container is made of a metal essentially inert to the electrolytic solution. The container can also be connected to the voltage source. In some embodiments, electrode 1 and noble-metal-containing material 2 are completely immersed into the electrolytic solution.

According to certain embodiments, the system comprises an agitator that is configured to agitate the electrolytic solution while the electric current is transported between the electrode and the noble metal such that removal of the noble metal is enhanced. For example, referring to FIG. 1, in some embodiments, recirculation is accomplished using agitator 7. The agitator can comprise, for example, a moving surface comprising curvature and/or protrusions configured to agitate the electrolytic solution when the moving surface is moved. Examples of agitators include, but are not limited to, a propeller, an impeller, a magnetic stirrer, and the like.

Electrode 1 can be configured, in some embodiments, such that it has a chemically resistant bag 8 (e.g., an acid resistant bag) at least partially surrounding it.

Upon applying a voltage across electrode 1 and noble-metal-containing material 2, electric current can be transferred between them. During the process, noble metal can be detached from the exposed surface(s) of the noble-metal-containing material. The detached noble metal can be stirred or otherwise agitated once it enters the electrolytic solution. In certain embodiments, the bag around electrode 1 can be used to prevent electrode 1 from short circuiting. In some embodiments, the bag around electrode 1 can be used to isolate base metals impurities. During the electrolytic process, even if the material of the substrate of the noble-metal-containing material (which can serve as the anode) is essentially inert to the electrolytic solution, some minor amounts of the base metals might be stripped from the substrate, oxidized, and dissolved in the electrolytic solution. For example, in some embodiments in which the coating is made of an impure noble metal and/or alloy (such as a karat gold plated items), the base metals in the coating might also be dissolved in the electrolytic solution. In some embodiments, non-noble metals which dissolve in the electrolytic solution during the transporting of the electric current between the electrode and the noble metal simultaneously deposit on the cathode. For example, referring to FIG. 1, in some embodiments, because the electrolytic solution is a good electrolyte, the positively charged ions of the base metals will generally migrate toward electrode 1 and deposit on it. Dissolved non-noble metals can be allowed to pass through the cathode bag. The cathode bag may be configured, in some embodiments, such that it is impermeable to at least a portion of the solid particles of the stripped noble metals. In this way, the noble metals can be kept separate from the base metals, which deposit on the cathode. For example, in FIG. 1, base metals are shown as deposit 9 on the bottom of bag 8). The deposited base metals can be removed from electrode 1 from time to time, for example, by mechanical scrubbing of the deposited metals from the surface of electrode 1. In this way, the electrolytic solution may remain relatively free from dissolved base metals, which can allow for substantially continuous operation of the electrolytic process. In addition, in some such embodiments, the electrolytic bath solution can be kept functional essentially indefinitely, potentially only requiring some make-up addition of chemicals (e.g., due to mechanical losses and/or possible gas formation on the electrodes).

Electrolytic solution 5 will contain stripped noble metals of the substrate. As noted elsewhere, in certain embodiments, the system comprises a separator configured to at least partially separate the noble metal removed from the noble-metal-containing material from the electrolytic solution. In some embodiments, operation of the system comprises at least partially separating the noble metal from the electrolytic solution. The noble metal separated from the electrolytic solution may be, for example, in solid form. In some embodiments, the separator is configured to at least partially separate elemental noble metal from the electrolytic solution. In some embodiments, a solid-liquid separator can be used to separate the noble metal(s) from the electrolytic solution. For example, in FIG. 1, solid-liquid separator 10 can be used to separate the noble metal(s) removed from the noble-metal-containing material from the electrolytic solution. In some embodiments, operation of the system comprises at least partially separating the noble metal from the electrolytic solution using a solid-liquid separation technique. According to certain embodiments, a part of the electrolytic solution with noble metals can be transported out of the electrolytic vessel, and the stripped solids can be separated from the liquid electrolytic solution. Any type of solid-liquid separation techniques (such as filtration, gravity settling and decanting, centrifuging, and the like) can be employed. The noble metal(s) can be recovered as solids 11. In addition, the liquid can be returned back to the electrolytic bath, for example, using a pump such as pump 12 in FIG. 1. In one set of embodiments, the electrolytic process can be stopped, the electrolytic solution can be pumped out of the vessel, and the solid noble metals can be settled and recovered from the bottom. One set of embodiments comprises continuously reusing the electrolytic solution. For example, the electrolytic solution can be recirculated into and out of the vessel using a pump or other transport device.

Certain embodiments comprise keeping the volume of the electrolytic solution within the vessel substantially constant (e.g., to within 5% of the time-averaged volume) during the transporting of the electric current between the electrode and the noble metal. In some such embodiments, keeping the volume of the electrolytic solution constant comprises discharging a portion of the electrolytic solution from the vessel and providing a makeup stream of electrolytic solution to the vessel.

According to certain embodiments, the temperature of the electrolytic solution is maintained between about 10° C. and about 100° C. during operation. For example, some embodiments comprise maintaining the electrolytic solution between about 10° C. and about 100° C. while transporting electric current between the electrode and the noble-metal-containing material.

In certain embodiments, the current density at the noble-metal-containing material is maintained at 0.01 A/cm$^2$ or more during operation. For example, some embodiments comprise maintaining the current density at the noble-metal-containing material at 0.01 A/cm$^2$ or more while transporting electric current between the electrode and the noble-metal-containing material.

In some embodiments, the system is configured such that, when an electric current is transported between the counter electrode and the noble metal, at least a portion of the noble metal from the noble-metal-containing material is plated on the counter electrode. For example, referring to FIG. 1, in some embodiments, system 100 can be operated such that at least a portion of the noble metal from noble-metal-containing material 2 can be plated on electrode 1.

According to certain embodiments, it can be advantageous (although it is not necessarily required) to use an electrode (e.g., cathode) having an exposed external surface area that is larger than the exposed external surface area of the noble-metal containing material (e.g., the anode). Employing such an electrode arrangement can reduce stripping time and/or energy consumption. In some embodiments, the surface of the electrode that is exposed to the electrolytic solution is at least about 50% larger than the surface area of the noble-metal-containing material that is exposed to the electrolytic solution. In some embodiments, the exposed external surface area of the electrode (e.g., the cathode) should be at least equal to, at least 2 times larger, or at least 5 times larger than the exposed external surface area of the noble-metal-containing material.

Figure 2:
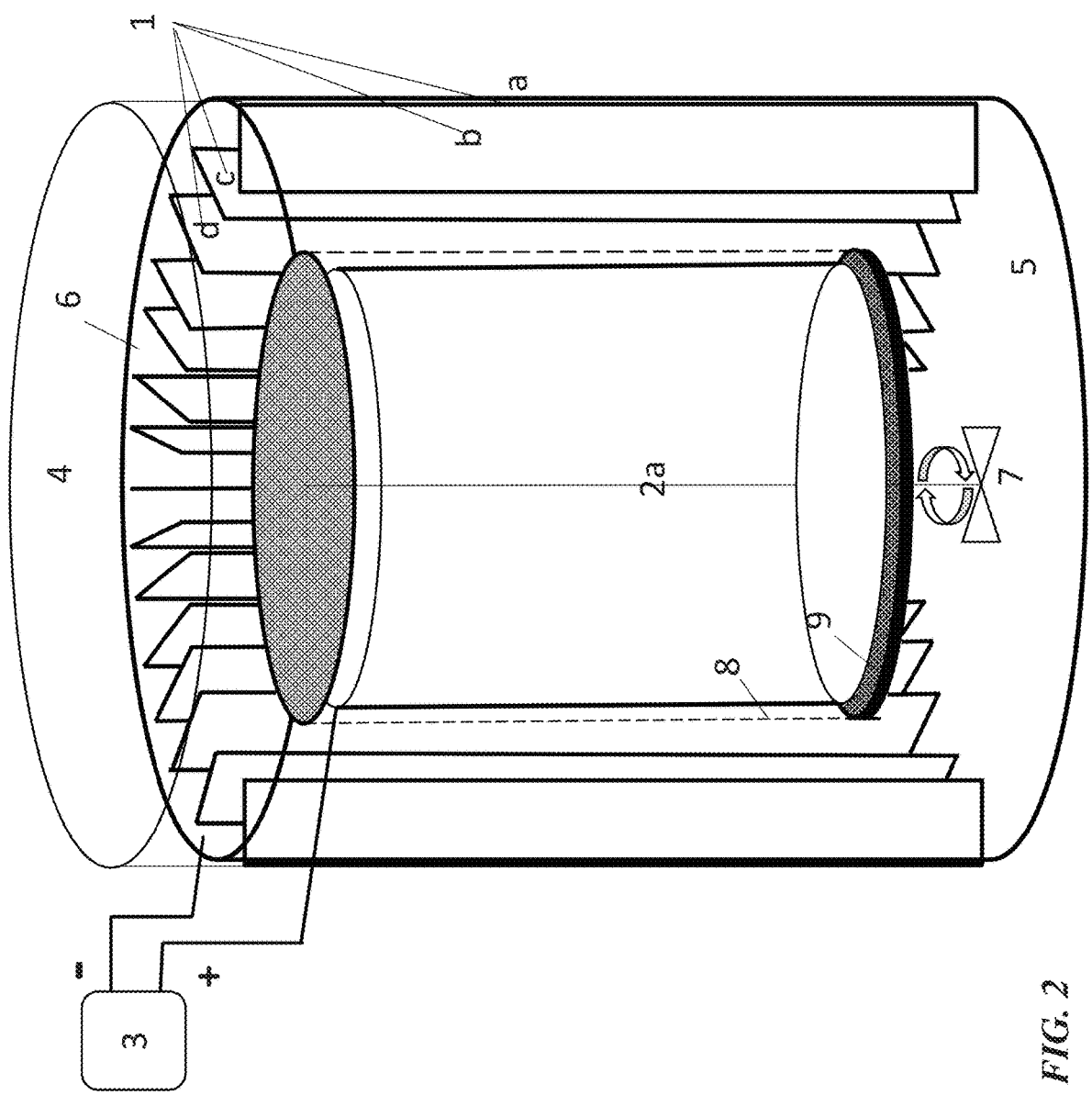
FIG. 2 is, according to some embodiments, a schematic diagram of a vertical apparatus for the electrolytic recovery of noble metal from noble-metal-containing material.

In some embodiments, the electrode and the noble-metal-containing material can be closely spaced. In some such embodiments, closely spacing the noble-metal-containing material and the counter electrode allows the electrolyte to pass freely between the electrodes. Generally, the productivity of the electrolytic cell will be determined by the size of the conductive container in which the noble-metal-containing items are located for treatment. FIG. 2 is a schematic illustration of one exemplary system, in which the vessel of the electrolytic cell serves as a counter electrode itself. In this set of embodiments, counter electrode wall 1a is in the shape of vessel 4. The reservoir can be made of any common conductive material (e.g., metal) or non-conductive material (e.g., glass, ceramic, plastics, etc.). In certain embodiments, the reservoir can be lined with a conductive material. As one example, a metallic liner over a polypropylene reservoir can be used as a counter electrode, for example, by connecting the liner to a voltage source 3. In order to increase the surface of the cathode, vertical plates, baffles, fins, or any other protrusions may be attached to the liner in some embodiments. For example, in FIG. 2, vertical plates 1b, 1c, and 1d are attached to the liner along their vertical sides, thereby forming a counter electrode with an increased surface area.

In some embodiments, a high surface area counter electrode material can be used. For example, in some embodiments, a carbon foam electrode can be used. In some embodiments, a metal mesh (e.g., a stainless steel mesh or titanium mesh) can be used as a high surface area electrode. Such electrodes can be, for example, placed inside the reservoir close to its walls.

Referring back to FIG. 2, conductive container 2a is placed in the center of the vessel, so that its surface is close to the surface of the counter electrode, and some distance is left between these two surfaces to enable free circulation of the electrolyte. The electrolytic cell shown in FIG. 2 includes electrolytic solution 5. For simplicity, the electrolytic solution level 6 is shown as being equal to the upper level of the cathode liner and the cathode plates. In some embodiments, the electrolytic solution may be agitated. Such agitation can allow for efficient stripping of noble metal(s) from the noble-metal-containing material. The agitation of electrolytic solution 5 may be accomplished, for example, by stirring (as illustrated in FIG. 2) and/or via recirculation.

In certain embodiments, an acid resistant container can be placed around the container in which the noble-metal-containing material is located. For example, in FIG. 2, chemically resistant bag 8 (e.g., an acid resistant bag) is placed around the conductive container in which the noble-metal-containing material is located. In some such embodiments, the noble metals remain in the bag (shown as deposit 9 on the bottom of the bag) and can be recovered as soon as the stripping process is over and the conductive container is lifted in order to remove the stripped substrates. In certain embodiments, base metals will dissolve in the electrolyte during the stripping process, and will deposit on the counter electrode surface. In some such embodiments, the counter electrode can be cleaned or replaced from time to time in order to remove the base metals.

Figure 3:
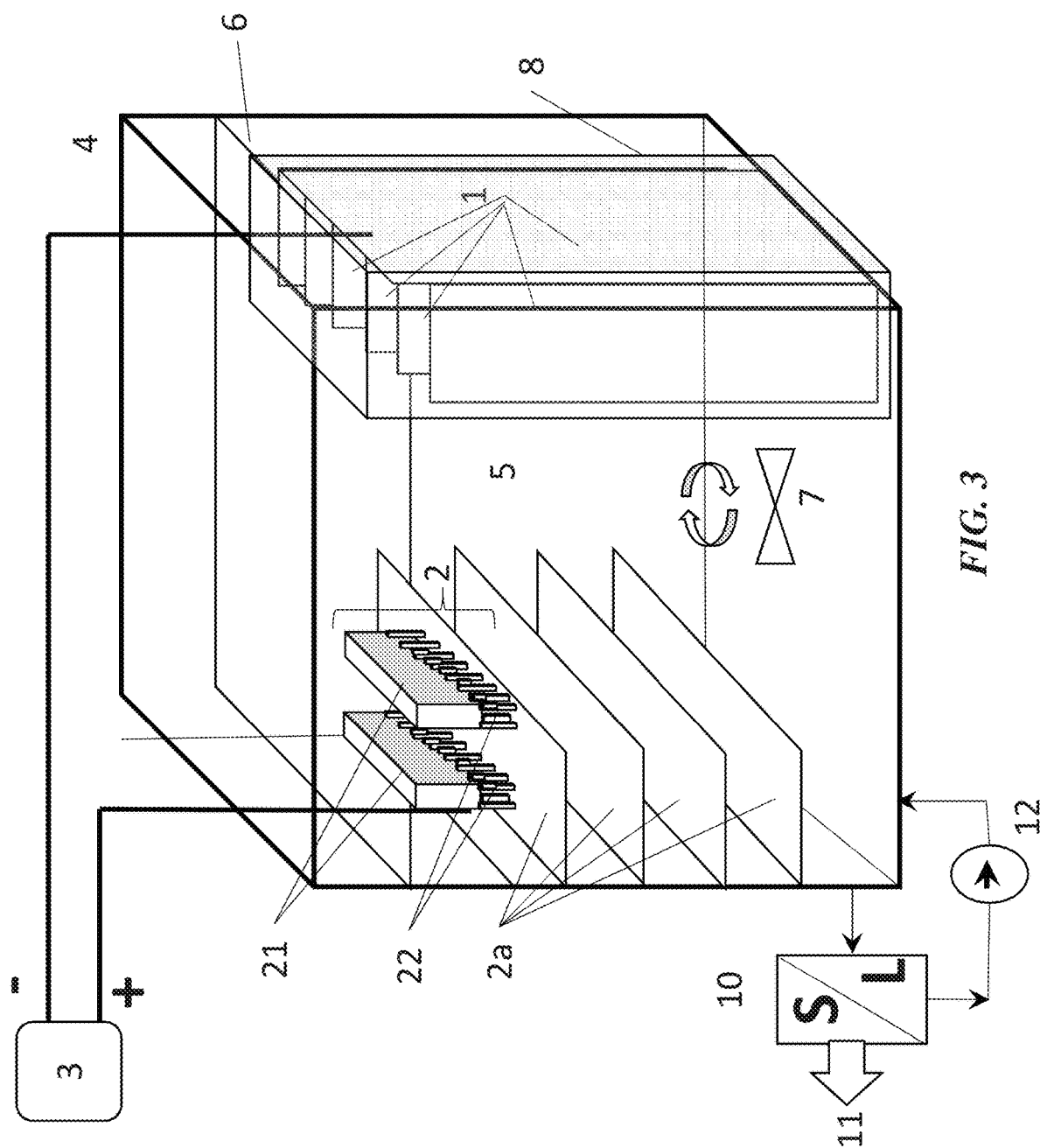
FIG. 3 is a schematic diagram of an apparatus for the electrolytic recovery of noble metal from noble-metal-containing material, according to some embodiments.

FIG. 3 is a schematic diagram of an exemplary process in which the noble-metal-containing material is generally non-conductive, but includes conductive parts (e.g., parts which are coated with noble metals or noble metal alloys). In FIG. 3, counter electrode 1 is shown to be made of several metallic plates connected together and to the negative pole of the voltage source. The plates can beneficially increase the surface area of the counter electrode. A set of horizontally arranged plates, attached together and connected to the positive pole, can be used to conduct current to the noble-metal-containing material. The counter electrode and the current conducting plates can be placed into a vessel 4, into which electrolytic solution 5 may be transferred. In FIG. 3, the level of the electrolytic solution in the cell is shown as 6. The electrolyte can be kept agitated using agitator 7. Resistant bag 8 can be positioned around the counter electrode, which can have the same function as in the embodiments described above. The non-conducting noble-metal-containing items can be placed on the upper horizontal plate. In FIG. 3, reference numeral 21 indicates the non-conductive parts of the items, while reference numeral 22 indicates the conductive parts (which can be made of base metals and/or less noble metals, coated by the noble metals one wishes to remove). The items can be placed onto the surface of the current conducting plates in such a way that the metallic plated/covered parts are touching the plate surfaces and in such a way the electric circuit involving the counter electrode, the conductive plates, the electrolyte and the voltage source is kept closed. While only two items are shown in FIG. 3, more items could be placed in the same manner onto each horizontal conductive plate. Noble-metal-containing electrolytic solution can be pumped out of the vessel. Solids 11 can be separated from the liquid electrolytic solution in separator 10 and can be recovered. The liquid electrolytic solution can then be recycled back to the reservoir (e.g., using pump 12).

Figure 4:
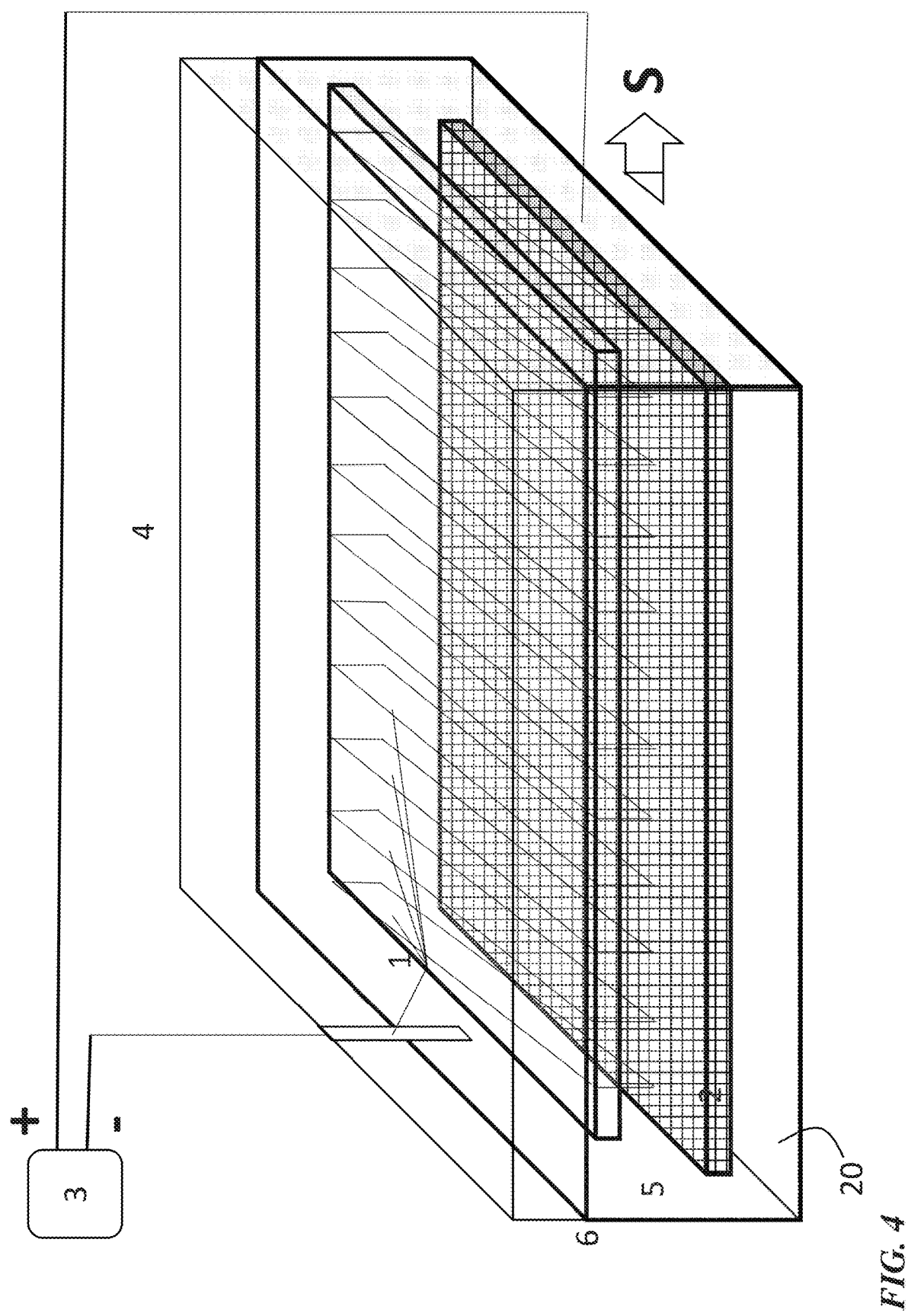
FIG. 4 is, according to certain embodiments, a horizontal set-up for the electrolytic recovery of noble metal from noble-metal-containing materials.

FIG. 4 is a schematic illustration of a horizontal set-up of an apparatus that can be used to perform electrolytic removal of noble metal from noble-metal-containing material. The exemplary system in FIG. 4 includes a vessel 4 containing electrolytic solution 5 up to level 6. The system in FIG. 4 also includes a counter electrode 1, conductive plate 2a, and a voltage source 3. The counter electrode comprises a horizontal plate. The plate of the counter electrode can be any suitable size. For example, in some embodiments, the plate of the counter electrode is as large as the surface of the bottom of vessel 4. In FIG. 4, several smaller plates are attached to the base perpendicularly in order to increase the counter electrode surface area. Other types of counter electrode arrangements can also be used, such as rods, plates, metal foils, metal meshes, metal shavings, metal covered plastic/glass/ceramic surfaces, etc. Container 2a can be configured to conduct electric current to the noble-metal-containing material. The container can have any suitable form factor. For example, as shown in FIG. 4, the container has similar dimensions as the bottom of the reservoir or smaller. The container can be installed directly underneath the counter electrode, in some embodiments. In certain embodiments, the material from which the noble metal(s) is to be removed is placed in the conductive container in an equally distributed layer and in such a way that each item touches at least at one point of either the conductive container or another item which is touching the conductive container, so that the electric current can pass through all the items in the conductive container. The conductive container can have a perforated surface and/or walls so that the removed noble metal(s) powder can fall through the holes down to tray 20 and be collected there. According to certain embodiments, the process can be intensified if stirring and/or recirculation of the solution is performed. In this case, the solution can be filtered and the removed noble metal materials can be collected. In some embodiments, the solids (S) can be deposited on a tray and can be collected when the tray is removed from the solution at the end of the removal process. In certain embodiments, the base metals from the solution will plate out on the counter electrode and the counter electrode can be cleaned from time to time to remove the plated metals. Alternatively, a counter electrode bag made of a chemically resistant permeable material can be used to isolate the counter electrode and to prevent the plated base metals from leaving the vicinity of the counter electrode and mixing with the recovered stripped material.

It can be advantageous, according to certain (although not necessarily all) embodiments, for the electrolytic solution to have one or more (or all) of the following properties: good electrical conductor, chemically inert toward the metals from which the substrate of the noble-metal-containing material is made, resistant to the formation of solid deposits upon dissolution, and resistant to hydrolysis.

According to certain embodiments, the electrolytic solution comprises a sulfonic acid. For example, in some embodiments, the electrolytic solution comprises an aqueous solution of a sulfonic acid. In certain embodiments, the electrolytic solution comprises at least one sulfonic acid represented by:

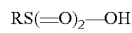

wherein R is an alkyl group containing 1-12 carbon atoms, an alkenyl group containing 1-12 carbon atoms, a hydroxyalkyl group containing 1-12 carbon atoms, or an aryl group containing 6-12 carbon atoms. In some embodiments, the electrolytic solution comprises an aqueous solution of an alkanesulfonic acid, comprising an alkyl group containing 1-5 carbon atoms. Combinations of these may also be used.

According to certain embodiments, the electrolytic solution comprises an alkane sulfonic acid. Examples of suitable alkane sulfonic acids that can be used include, but are not limited to, ethanesulfonic acid, propanesulfonic acid, isopropanesulfonic acid, butanesulfonic acid, isobutanesulfonic acid, methanesulfonic acid, and combinations of two or more of these. In some embodiments, the electrolytic solution is an aqueous solution of methanesulfonic acid. Methanesulfonic acid is a strong organic acid that is substantially completely non-oxidizing at high concentrations, and that forms highly soluble salts with many metals. Methanesulfonic acid has a high dissociation constant, and is therefore a good electrolyte. Methanesulfonic acid also has substantially no odor, and it is sometimes described as being a "green acid" because of its ecological advantages (e.g., readily biodegradable, virtually VOC free, having low TOC, making hardly any contribution to COD, being free of nitrogen, phosphorus and halogens, etc.).

In certain embodiments, the electrolytic solution comprises a mixture of acid and water having a water content of less than or equal to about 30 weight percent (wt %). In some embodiments, the electrolytic solution has a water content of less than or equal to about 20 wt %, less than or equal to about 10 wt %, less than or equal to about 5 wt %, less than or equal to about 2 wt %, less than or equal to about 1 wt %, or less than or equal to about 0.1 wt %. In some embodiments, the electrolytic solution (e.g., comprising a sulfonic acid, including any of the sulfonic acids described herein and mixtures thereof) has a water content of less than or equal to 30 wt %. For example, according to certain embodiments, the electrolytic solution comprises methanesulfonic acid and has a water content of less than or equal to 30 wt %. Including less water in the methanesulfonic acid solution helps to prevent the electrolytic solution from reacting with base metals the noble-metal-containing material. It can be advantageous, according to certain (but not necessarily all) embodiments, to keep the electrolytic bath solution as free as possible from the dissolved base metals, as doing so may lead to slower consumption of the electrolytic solution, less frequent recycling of the electrolytic solution, and eventually a cheaper and simpler process. Some embodiments comprise recovering the balance of the noble-metal containing material in a substantially undamaged form. For example, in some embodiments, after noble metals have been removed from the noble-metal-containing material, the remainder of the noble metal-containing-material can be recovered in substantially undamaged form. In some embodiments, the base metal substrates can be recovered undamaged.

According to certain embodiments, the electrolytic solution has a relatively high concentration of sulfonic acid(s). For example, in some embodiments, the total amount of the sulfonic acid(s) (either as a single sulfonic acid (e.g., methanesulfonic acid), or as a combination of two or more sulfonic acids) within the electrolytic solution is greater than or equal to about 10 wt %, greater than or equal to about 20 wt %, greater than or equal to about 30 wt %, greater than or equal to about 40 wt %, greater than or equal to about 50 wt %, greater than or equal to about 60 wt %, greater than or equal to about 65 wt %, or greater than or equal to about 70 wt %. In some embodiments, even higher concentrations of sulfonic acid(s) can be used. For example, in some embodiments, the total amount of the sulfonic acid(s) within the electrolytic solution is greater than or equal to about 71 wt %, greater than or equal to about 75 wt %, greater than or equal to about 80 wt %, greater than or equal to about 85 wt %, greater than or equal to about 90 wt %, greater than or equal to at about 95 wt %, greater than or equal to about 98 wt %, greater than or equal to about 99 wt %, or greater than or equal to about 99.9 wt %.

When base metals dissolve in methanesulfonic acid, relatively large amounts can accumulate. Thus, formation of solid precipitates of the dissolved base metals (which generally occurs once the dissolved metals concentration reaches super saturation) can be reduced or avoided. According to certain embodiments, precipitation of the base metals is undesirable because the solid base metal precipitates can be mix with the stripped materials and eventually pollute the noble metals.

According to certain embodiments, limiting the amount of water in the methanesulfonic acid electrolytic solution to between 0 and 30 wt % can be useful in inhibiting (or preventing) the unwanted dissolution of base metals. Although, methanesulfonic acid is hygroscopic, water accumulation from the ambient air during the process of stripping is possible. Thus, according to certain embodiments, additional measures can be taken to reduce surface contact of the electrolytic bath with air and/or water. In some embodiments, periodic water removal from the electrolytic liquid can be performed (for example, using dewatering ionic exchange resins).

As already mentioned, some minor amounts of base metals from the substrate of the noble-metal-containing material, from impure noble metal coatings, and/or from the counter electrode and/or current collector materials may still dissolve and accumulate, over time, in the electrolytic solutions. Often, these materials accumulate in relatively small amounts compared to the amounts of the removed noble metal. Generally, the electrolytic solution has good electrolytic properties. Consequently, the system can be configured, according to certain embodiments, such that deposition of dissolved base metals occurs on the counter electrode. In some such embodiments, the electrolytic solution will be "self-recycled" during the stripping process, as base metals will be precipitated from the electrolytic solution and will be removable in a solid form. The electrolytic solution is maintained, in some such embodiments, such that it contains relatively low amounts of the dissolved base metals. If accumulation of the base metal(s) in the electrolytic solution occurs faster than the removal of the base metals by precipitation, purification of the electrolytic solution can be performed. For example, in some such embodiments, the electrolytic solution can be recirculated through a resin bed column, wherein the dissolved base metals can be captured by the resins and the purified electrolytic solution can be brought back to the electrolytic bath. If the electrolytic solution comprises an acid or a mixture of acids, the base metals can be removed and the acid can be recycled using diffusion dialysis process.

When the noble-metal-containing material is inserted into the electrolytic bath, and the electric current passes through the electrolytic solution, the noble metal can be removed from the surface of the underlying substrate in the noble-metal-containing material. Surprisingly, it was discovered that effective performance could be achieved without providing a supplemental noble metal oxidant within the electrolytic solution. Accordingly, in some embodiments, the bulk of the electrolytic solution is substantially free of a supplemental noble metal oxidant. An electrolytic solution is said to be substantially free of a supplemental noble metal oxidant when the bulk concentration of noble metal oxidants in the electrolytic solution is less than 3 wt %, and in some embodiments, may be less than 1 wt %, or less than 0.1 wt %.

According to certain embodiments, the electrolytic solution comprises persulfuric acid. The persulfuric acid may be present in place of or in addition to a sulfonic acid in the electrolytic solution (including any of the sulfonic acids mentioned elsewhere herein, and mixtures of these).

In some embodiments, the electrolytic solution comprises a peroxymonosulfate ion ($SO_5^{2-}$) and/or a peroxydisulfate ion ($S_2O_8^{2-}$). The peroxymonosulfate ions and/or peroxydisulfate ions may be present in place of or in addition to a sulfonic acid in the electrolytic solution (including any of the sulfonic acids mentioned elsewhere herein, and mixtures of these).

In many previously known systems, the electrolytic system contained an electrolytic solution comprising both a first component capable of oxidizing noble metals and a second component capable of forming stable complexes with noble metals. The ability to remove noble metals from noble-metal-containing compounds without the need for use of added noble metal oxidant can be advantageous, according to certain embodiments, because the chemical solutions which are capable of oxidizing noble metals are normally toxic and very chemically aggressive. Certain of the processes described herein, on the other hand, can be successfully applied even though the electrolytic solution is known to be non-oxidizing and/or is known to be inert for the noble metals. As one particular example, methanesulfonic acid does not appreciably oxidize and dissolve gold. Moreover, the use of methanesulfonic acid can be advantageous in certain embodiments in which copper is used because even highly concentrated methanesulfonic acid does not appreciably attack copper metal, which is often used as a substrate. On the other hand, methanesulfonic acid will effectively remove gold and other noble metals from the surface of copper.

Without wishing to be bound by any particular theory, it is believed that the use of methanesulfonic acid (and similar alkyl sulfonic acids and other sulfonic acids) leads to the oxidation of noble metals via the production of persulfuric acid, which is produced from sulfonic acids by electrolysis. It is believed that this process allows for the removal and recovery of noble metals.

Without wishing to be bound by any particular theory, it is believed that hydrogen peroxide is generated at the noble-metal-containing material during electrolysis:

$$2H_2O = H_2O_2 + 2H^+ + 2e^- \quad (-1.78V) \tag{1}$$

and that hydrogen is produced at the counter electrode:

$$2H_2O + 2e^- = H_2 + 2OH^- \quad (0.83V) \tag{2}$$

It is believed that methanesulfonic acid reacts with the hydrogen peroxide in the vicinity of the anode to produce methylsulfuric acid, as follows:

(3)

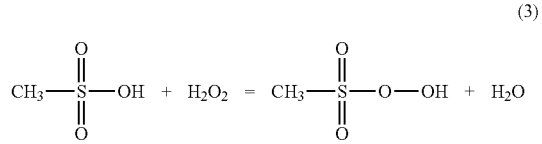

It is further believed that the methylsulfuric acid is further transformed to peroxymonosulfuric acid, as follows:

(4)

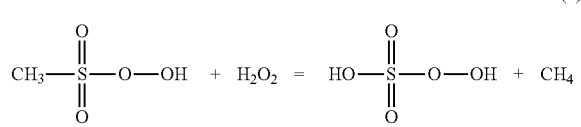

The persulfuric acid has the ability to oxidize noble metals (which can happen at the noble-metal-containing material (as it functions as the anode). It is believed that, as soon as the oxidized metal moves further from the noble-metal-containing material (e.g., because of diffusion or forced agitation), it is reduced to the solid metal state. When gold is the target noble metal material, this can result in very fine gold particles appearing in the electrolytic solution, giving it a purple/dark blue color, which is characteristic for micron-sized gold particles. After the solid particles have been formed, they can be removed from the solution by any known solid-liquid separation technique, as filtration, centrifuging, decanting etc. Some base metals can be oxidized and dissolved by the sulfonic acids (especially in diluted aqueous solutions), but the base metals will generally plate out on the cathode. In such a way, the base metals can be removed from the electrolytic solution, allowing for the auto-regeneration of the electrolytic solution, which can be re-used in subsequent cycles of anodic oxidation of noble metals.

Peroxymonosulfuric acid can also be generated by acid hydrolysis of persulfates, as follows:

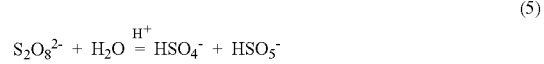
(5)

The anodic stripping of noble metals therefore will work in acidic solutions of persulfates. Although, as the solutions containing persulfates will generally also oxidize and dissolve base metals, the noble metal coatings will be partially recovered in the form of the solid metal powder as a result of oxidation by the persulfuric acid, and partially in the form of stripped noble metal coating, caused by the dissolution of the base metals underneath the coating and the undercutting effect.

Accordingly, in some embodiments, the system is configured such that, when an electric current is transported between the electrode and the noble metal, an oxidizing agent is generated at or near the noble-metal-containing material. The oxidizing agent can comprise, for example, peroxymonosulfuric acid, peroxydisulfuric acid, and/or hydrogen peroxide. In certain embodiments, the oxidizing agent comprises peroxymonosulfuric acid and/or peroxydisulfuric acid. In some embodiments, the peroxymonosulfuric acid and/or the peroxydisulfuric acid is generated by the electrolysis of the electrolytic solution. In some embodiments, the system is configured such that, when the oxidizing agent is generated in the vicinity of the noble-metal-containing material, the oxidizing agent oxidizes and/or dissolves at least a portion of the noble metal.

In some embodiments, the system is configured such that, when an electric current is transported between the electrode and the noble metal, at least a portion of the noble metal is chemically reduced to the form a noble-metal-containing product. In certain embodiments, the system is configured such that, when an electric current is transported between the electrode and the noble metal, the noble-metal-containing product, or a precursor thereof, is transported away from the noble-metal-containing material.

According to certain embodiments, the system is configured such that, when an electric current is transported between the electrode and the noble metal, a noble-metal-containing product is recovered as a salt of an acid contained in the electrolytic solution. For example, the noble-metal-containing product (which includes noble metal removed from the noble-metal-containing material) can form a solid salt of an acid of the electrolytic solution. In some such embodiments, the solid salt can be separated from the electrolytic solution to produce a solid noble-metal-containing product. For example, in some embodiments, the noble-metal-containing product is recovered as a salt of a sulfonic acid.

In some embodiments, the system is configured such that, when an electric current is transported between the electrode and the noble metal, an elemental noble metal powder is recovered. For example, noble metal removed from the noble-metal-containing material can form a solid powder, which can be separated from the electrolytic solution, according to certain embodiments.

Figure 5:
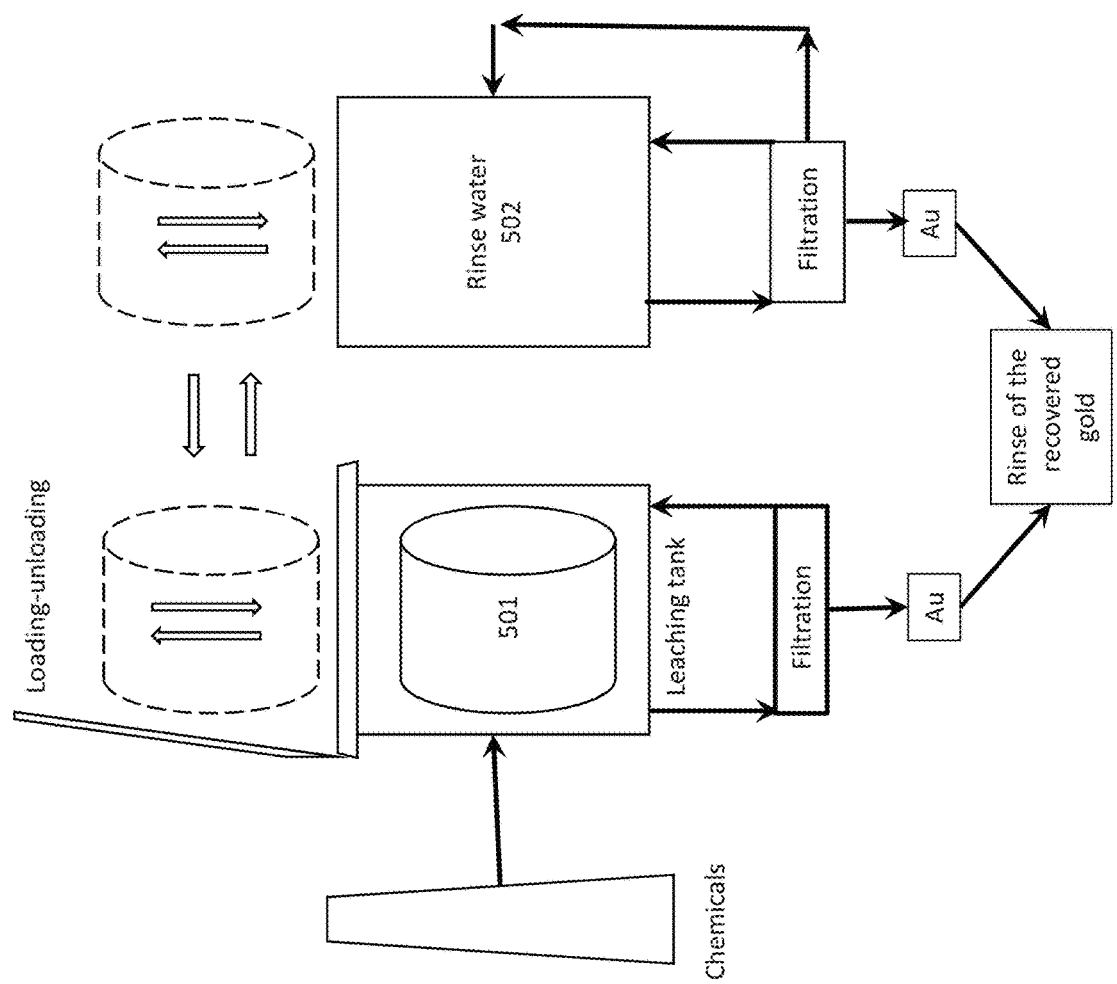
FIG. 5 is a schematic illustration, according to certain embodiments, of a process for recovering gold from gold-containing material.

In certain embodiments, the system is configured such that, when an electric current is transported between the electrode and the noble metal, at least a portion of the noble metal from the noble-metal-containing material is plated on the electrode. For example, in some embodiments, at least a portion of the noble metal from noble-metal-containing material One exemplary process for recovering gold from gold containing material is illustrated in FIG. 5. The process illustrated in FIG. 5 includes two main steps: anodic stripping and filtration. The types of materials that have been treated using this method are: gold plated copper wires and karat gold filled scrap. In FIG. 5, the noble metal containing material can be placed on racks, in baskets, or in a rotating barrel 501, which can be used as an anode. Stainless steel bars can be used as a cathode. Generally, the gold stripping process is over when the electrical current applied to the system drops to substantially zero.

Any of the electrolytic solutions described herein can be used in the process illustrated in FIG. 5. In some embodiments, the electrolytic solution comprises methanesulfonic acid (e.g., 70 wt % methanesulfonic acid). Upon being dissolved, the gold will generally appear in the solution in the form of fine black/deep blue/violet powder. In some embodiments, recirculation of the electrolytic solution speeds up the operation. The solution is considered saturated with the gold powder when the current does not drop to at or near zero even when the noble metal containing material is completely deplated, because of the conductivity of the dispersed particles. To inhibit this effect, a cathodic bag can be used around the cathode. The cathodic bag can be transparent for the ions dissolved in the electrolytic solution, and non-transparent for the fine solid gold particles.

As shown in FIG. 5, the solution loaded with fine gold particles can be filtered and brought back to the tank containing the electrolytic solution for treatment of new portions of the noble metal containing material. Mechanical losses of the solution can be replenished by the fresh acid. The stripped material can be transferred to a rinse water tank 502, in which fine gold powder will also accumulate and can be filtered out. The rinse water can then be reused. The recovered gold powder can be rinsed and melted into bars.

Certain embodiments relate to inventive systems and apparatus used to recover noble metals (e.g., gold and/or silver) from noble metal containing material. In some embodiments, the system comprises a rotatable container made of an electrically insulating and/or an electrically conductive material positioned within a vessel. The vessel may be configured to contain an electrolytic solution, including any of the electrolytic solutions described elsewhere herein.

In some such embodiments, the system comprises an electrically conductive pathway, for example, from a source of an electrical current to the interior of the rotatable container. In some embodiments, the electrically conductive pathway may be configured such that, when the noble metal containing material is contained within the rotatable container, the electrically conductive pathway remains in electrical communication with the noble metal containing material when the container is rotated.

Figure 7:
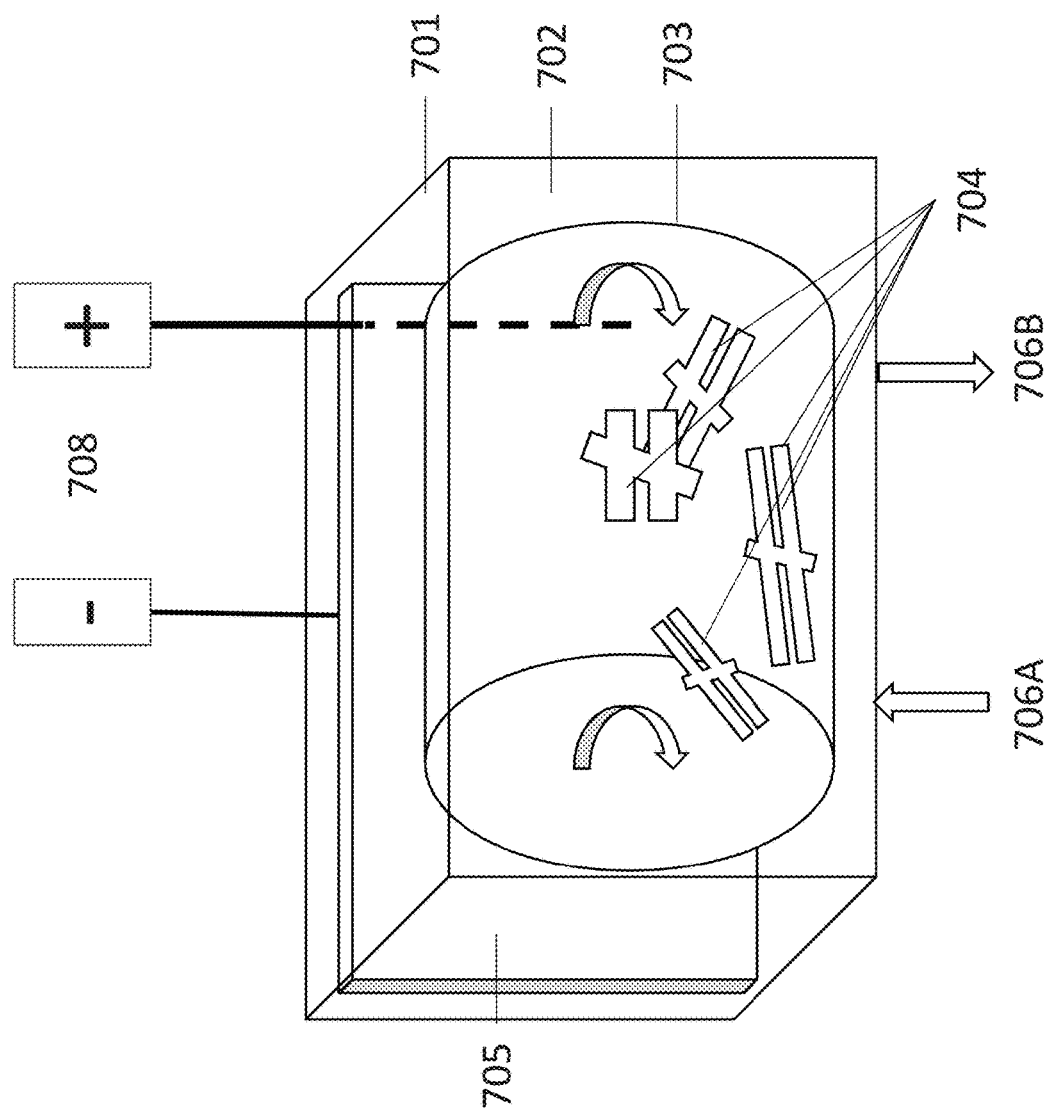
Figure 8:
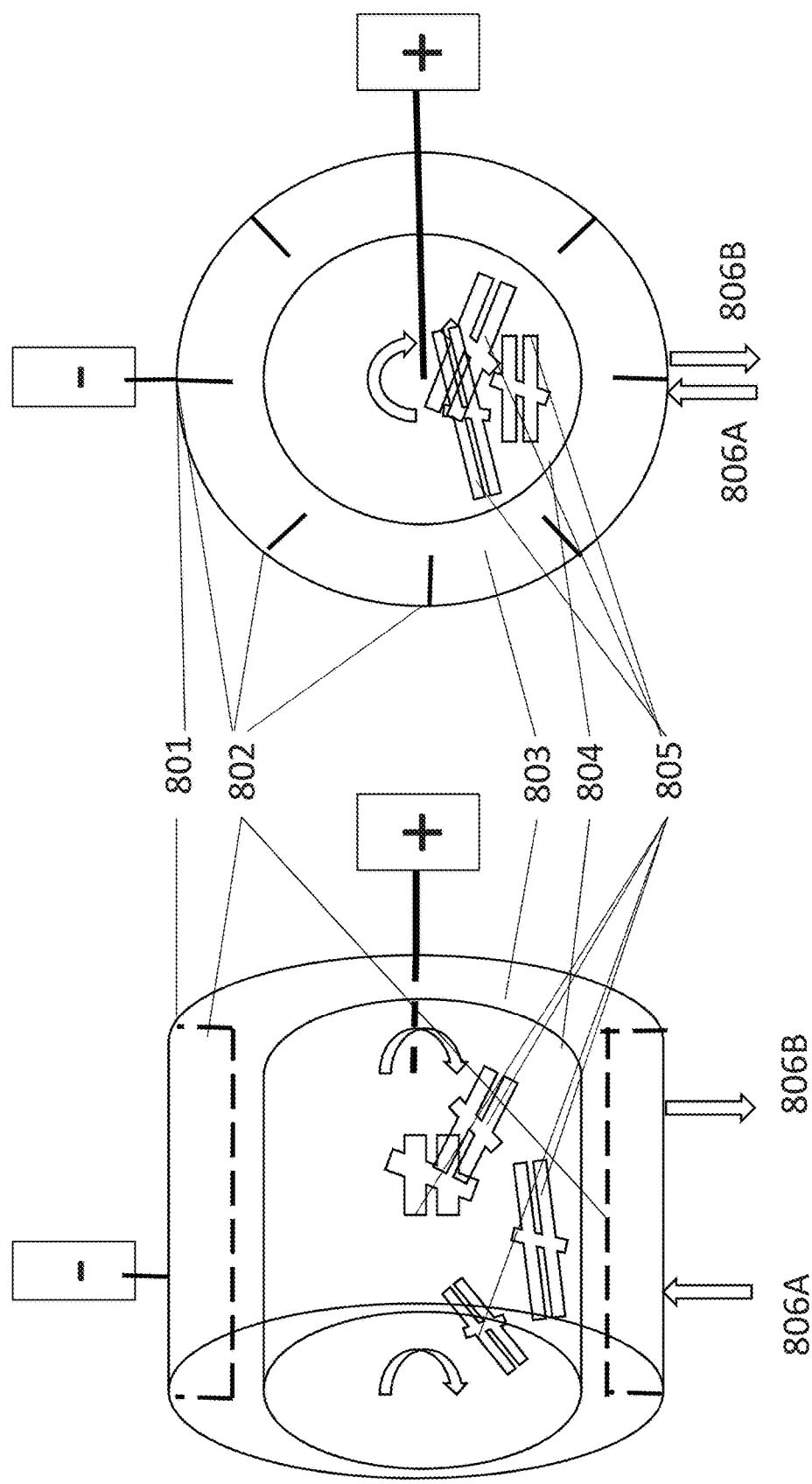

In some embodiments, the electrically conductive pathway can be in contact with the an electrically conductive rotatable container, and electricity can be transported through the pathway, through the electrically conductive rotatable container, to the noble metal containing material (and, in particular, the noble metals within the noble metal containing material) as the rotatable container is rotated. Non-limiting examples of systems in which such arrangements are used are shown in FIGS. 7-8.

In some embodiments, the electrically conductive pathway comprises an electrically conductive lead, such as a metallic lead. The electrically conductive lead can be inserted into the rotatable container and positioned such that the electrically conductive lead remains in contact with the noble metal containing material (and, in some such cases, the noble metal(s) within the noble metal containing material) when the container is rotated. During operation, the noble metal containing material can be placed in the rotatable container (e.g., a cylindrical container such as a barrel), and electrically conductive lead(s) (which may be made, for example, of titanium, any other corrosion resistant conductive material, or any other material) can be inserted such that they make contact with the rotatable container and/or the noble metal containing material within the rotatable container. In some embodiments, the conductive leads may be positioned such that they continuously remain in electrical contact with the noble metal containing material (which may move because of the rotation of the rotatable container), so that essentially all the noble metal containing material remains in the electrical contact with the electrically conductive leads. The leads can be connected to the positive pole of a direct current source, and in such a way the noble metal containing material serve as an electrode (e.g., an anode). A non-limiting example of a system in which such arrangements are used is shown in FIG. 6.

In certain embodiments in which an electrical current is used to at least partially remove the gold and/or silver, the other electrode (e.g., the cathode) can be made of any corrosion resistant conductive material, such as e.g. stainless steel, and can be placed inside the reactor (e.g., close to the rotatable container). The noble metal containing material can be placed in the rotatable container. The rotatable container can then be closed and immersed into the solution inside the reactor. In some embodiments, as soon as the electric current drops to substantially zero, the electrolytic solution can be pumped out of the reactor, and, in some such embodiments, rinse water can be pumped into the reactor. The rotatable container can be rotated with or without electrical current being applied, so that the noble metal containing material can be rinsed from the residues of the electrolytic solution. In some embodiments, the rinse water can then be transported out of the reactor. At this point the cover of the container can be lifted and the treated noble metal containing material can be removed.

Figure 6:
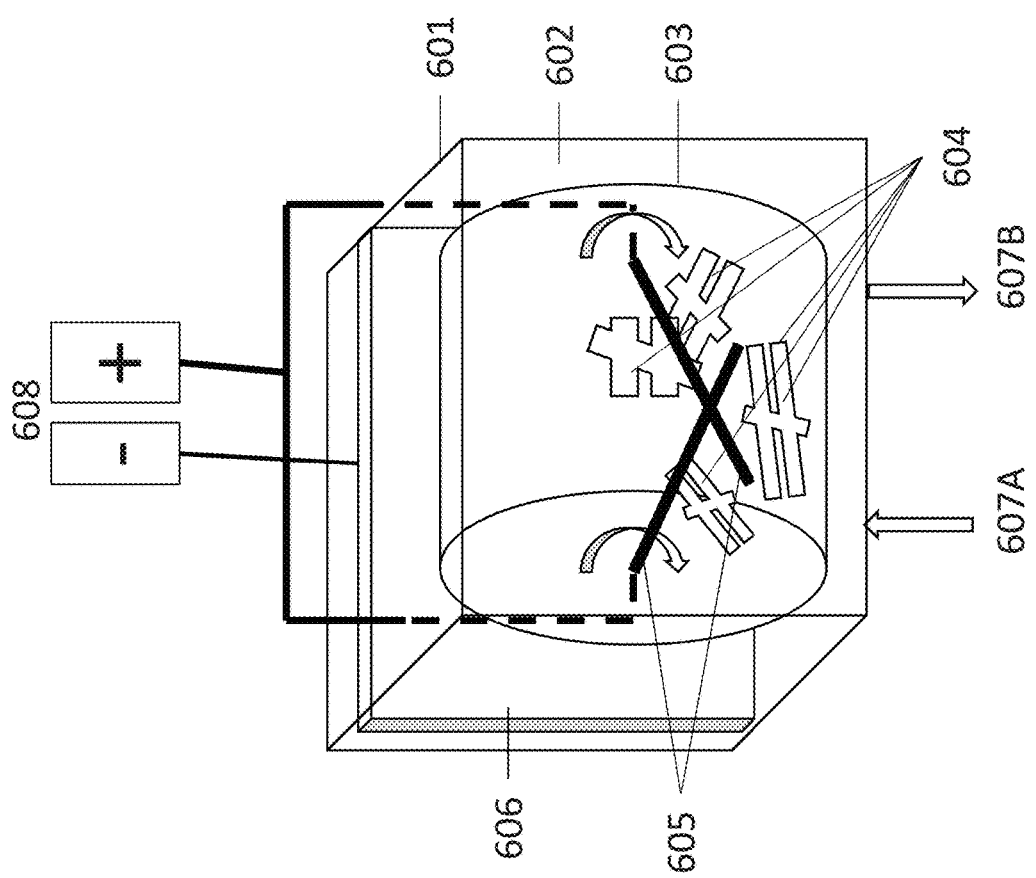
FIGS. 6-8 are, according to some embodiments, schematic illustrations of processing systems comprising a rotatable container.

FIG. 6 is an exemplary schematic illustration of a system in which a rotatable container (e.g., a barrel) is used to house the noble metal containing material. In FIG. 6, rotatable container 603 is placed inside container 601, which can be at least partially filled with electrolytic solution 602. The rotatable container can be at least partially (e.g., completely) submerged within the electrolytic solution in container 601. Noble metal containing material 604 can be loaded into rotatable container 603. In some embodiments, the rotatable container is made of electrically insulating material. In certain embodiments, anode leads (e.g., titanium rods) can be positioned within rotatable container 603 such that they remain in contact with noble metal containing material 604. In certain embodiments, the electrically conductive leads are inserted into the rotatable container (e.g., from one or multiple sides of the rotatable container) and remain loose inside the barrel so that the noble metal containing material remains in contact with the leads. The leads can be connected to the anode, such that the contact of the leads with the noble metal containing (which can be in contact with each other) make the noble metal containing work as an anode. Cathode 606 can be positioned within container 601 (e.g., outside rotatable container 603). Cathode 606 can be positioned, in some embodiments, such that the shortest distance between cathode 606 and rotatable container 603 is less than 1 meter, less than 10 cm, or less than 1 cm. In some embodiments, electrical current source 608 (e.g., a DC source or an AC source) can be configured such that it makes electrical contact with cathode 606 and the noble metal containing material 604 (e.g., via anode leads 605). In some such embodiments, an electrical current can be applied across the anode and the cathode, to aid in the dissolution of gold and/or silver from the noble metal containing material. In some embodiments, container 601 comprises an inlet 607A and/or outlet 607B. Inlet 607A and outlet 607B can allow one to circulate electrolytic solution and/or rinse liquid into and out of the container.

FIG. 7 is another exemplary schematic illustration of a system in which a rotatable container is used to house the noble metal containing material, according to certain embodiments. In FIG. 7, rotatable container 703 is placed inside container 701, which can be at least partially filled with electrolytic solution 702. The rotatable container can be at least partially (e.g., completely) submerged within the electrolytic solution in container 701. Noble metal containing material 704 can be loaded into rotatable container 703. Cathode 705 can be positioned within container 701 (e.g., outside rotatable container 703). Cathode 705 can be positioned, in some embodiments, such that the shortest distance between cathode 705 and rotatable container 703 is less than 1 meter, less than 10 cm, or less than 1 cm. In some embodiments, electrical current source 708 (e.g., a DC source or an AC source) can be configured such that it makes electrical contact with cathode 705 and the noble metal containing material 704. In some such embodiments, rotatable container 703 can comprise an electrically conductive material. For example, rotatable container 703 can be made of an electrically conductive material (e.g., a corrosion resistant conductive material) and/or rotatable container 703 can include an electrically conductive lining/insert (e.g., made of corrosion resistant conductive material). In certain embodiments, rotatable container 703 is connected to the anode of the current source, and the rotatable container can itself serve as part of the anode. Current can be transported to the noble metal containing material within the rotatable container via the electrically conductive material from which at least a portion of the rotatable container is made. In some such embodiments, an electrical current can be applied across the anode and the cathode, to aid in the dissolution of noble metals (e.g., gold and/or silver) from the noble metal containing material. In some embodiments, container 701 comprises an inlet 706A and/or outlet 706B. Inlet 706A and outlet 706B can allow one to circulate electrolytic solution and/or rinse liquid into and out of the container.

FIG. 8 is another exemplary schematic illustration of a system in which a rotatable container is used to house the noble metal containing material, according to certain embodiments. In FIG. 8, rotatable container 804 is placed inside container 801, which can be at least partially filled with electrolytic solution 803. The rotatable container can be at least partially (e.g., completely) submerged within the electrolytic solution in container 801. Noble metal containing material 805 can be loaded into rotatable container 804. In some such embodiments, container 801 can comprise an electrically conductive material. For example, container 801 can be made of an electrically conductive material (e.g., a corrosion resistant conductive material) and/or container 801 can include an electrically conductive lining/insert (e.g., made of corrosion resistant conductive material). In some embodiments, container 801 can be connected to the cathode of the current source, and container 801 can itself serve as part of the cathode. At the same time, container 801 can contain the electrolytic solution. In some embodiments, cathode plates 802 can be positioned within container 801 (e.g., outside rotatable container 804). For example, cathode plates 802 can be attached to the inner surface of container 801. Cathode plates 802 can increase the cathode surface area. Cathode plates 802 can be positioned, in some embodiments, such that the shortest distance between cathode plates 802 and rotatable container 804 is less than 1 meter, less than 10 cm, or less than 1 cm. In some such embodiments, rotatable container 804 can comprise an electrically conductive material. For example, rotatable container 804 can be made of an electrically conductive material (e.g., a corrosion resistant conductive material) and/or rotatable container 804 can include an electrically conductive lining/insert (e.g., made of corrosion resistant conductive material). In certain embodiments, rotatable container 804 is connected to the anode of the current source, and the rotatable container can itself serve as part of the anode. Current can be transported to the noble metal containing material within the rotatable container via the electrically conductive material from which at least a portion of the rotatable container is made. In some embodiments, an electrical current source (e.g., a DC source or an AC source) can be configured such that it makes electrical contact with cathode plates 802 and the noble metal containing material 805. In some such embodiments, an electrical current can be applied across the anode and the cathode, to aid in the dissolution of gold and/or silver from the noble metal containing material. In some embodiments, container 801 comprises an inlet 806A and/or outlet 806B. Inlet 806A and outlet 806B can allow one to circulate electrolytic solution and/or rinse liquid into and out of the container.

In some embodiments, the rotatable container can include openings (e.g., perforations) in its wall. By including such openings, electrolytic fluid may be transported into and out of (and, in some cases, can be circulated within) the rotatable container during the noble metal removal process.

Certain of the systems and methods described herein can be used to selectively remove noble metals (e.g., gold, silver, platinum, palladium, and/or alloys of these) from noble-metal-containing materials, relative to the removal of non-noble metal materials from the noble-metal-containing materials. For example, in some embodiments, noble metals (e.g., gold, silver, platinum, palladium, and/or alloys of these) are removed from the noble-metal-containing material at a rate (based on mass) that is at least about 5 times, at least about 10 times, at least about 20 times, at least about 50 times, at least about 100 times, or at least about 1000 times faster than the rate (based on mass) at which non-noble metal materials (e.g., non-noble metals, such as any of the base metals described herein) are removed from the noble-metal-containing material.

In certain embodiments, the system is operated such that at least about 50 wt %, at least about 75 wt %, at least about 80 wt %, at least about 85 wt %, at least about 90 wt %, at least about 95 wt %, at least about 98 wt %, or at least about 99 wt % of the noble metals (e.g., gold, silver, platinum, palladium, and/or alloys of these) are removed from the noble-metal-containing material. In some such embodiments, the system is operated such that less than about 20 wt %, less than about 10 wt %, less than about 5 wt %, less than about 2 wt %, less than about 1 wt %, or less than about 0.1 wt % of the non-noble metal material (e.g., non-noble metals such as base metals) within the noble-metal-containing material is removed from the noble-metal-containing material.

The present invention is further illustrated with reference to the following examples. While the invention has been described with reference to particular embodiments and features, these have been presented as illustrative of the process and are not intended as limitations of this invention as set forth in the appended claims. The following examples are intended to illustrate certain embodiments of the present invention, but do not exemplify the full scope of the invention.

Example 1

This example describes the removal of gold and silver from a metal alloy article using an electrolytic deplating process. The metal alloy article comprised a copper zinc alloy substrate covered with a layer containing gold and silver. The mass of the metal alloy article before the experiment was 0.836 g.

The surface of the metal alloy article was analyzed with a SPECTRO SCOUT X-ray fluorescence (XRF) analyzer (AMETEK), giving the following elemental composition: Cu=43.4%, Au=38.7%, Ag=13.4%, Zn=3.3%, and Ni=1.15%. Thus, the elemental analysis revealed that the metal alloy article was covered with a layer of impure gold and the coating contains gold, silver and some base metals. The concentration of gold in the coating was close to 10K. The metal alloy article was used as an anode. It was attached to the positive pole of a direct current supply (BK Precision 1621A) with a titanium wire (98% Ti). The weight of the wire before the experiment was 0.545 g. A titanium foil of 23.055 g with an external surface area of 150 cm$^2$ was used as a cathode. The foil was placed into a 300 ml glass beaker around its walls so that the form of the cathode matched the form of the walls of the beaker. 150 ml of 70% wt methanesulfonic acid (MSA) was added to the beaker, which was used as an electrolytic solution. The wire was partially immersed in the electrolytic solution and the metal alloy article was completely immersed. The solution was stirred with a magnetic bar at 150 rpm and the electric current was turned on. A constant voltage of 10.7 V was initially used, with a current of 5.22 A that decreased continuously. Gas formation was observed both on the cathode and the anode, which was more intensive at the beginning of the process, and the solution increased in temperature. The solution turned dark-blue (believed to be due to the presence of tiny gold particles). In 8 min, the current level dropped to around 0. The metal alloy article was subsequently removed from the electrolytic solution, detached from the wire, rinsed with DI water, and dried.

XRF analysis of the surface of the metal alloy article showed the following elemental composition after processing: Cu=74.1%, Zn=23.6%, Ga=1.36%, Sn=0.59%, Pb=0.41%, Ni=0.02%. Gold and silver were not detected, meaning that the filling was substantially completely stripped from the surface of the substrate. The weight of titanium wire after the experiment was 0.545 g and the weight of the deplated metal alloy article was found to be 0.616 g. The weight loss of the metal alloy article was believed to have been caused by the stripping of the gold and silver into the electrolytic solution. The titanium wire was not substantially corroded during the process.

The electrolytic solution composition was analyzed by inductively coupled plasma atomic emission spectroscopy (ICP-OES) (SPECTRO ARCOS EOP, AMETEK). The analysis showed: Cu=571.2 mg/L, Ti=0.271 mg/L, Ag=67.570 mg/L, Au=29.059 mg/L. Copper was the metal with the highest concentration in the electrolytic solution. Some gold was found in methanesulfonic acid. This was believed to have been due to the passage of submicron gold particles through the sampling filter (<0.22 microns), which were believed to have been atomized and detected by the ICP. Also, some gold may have remained in the solution in the form of a methanesulfonate. The stripped metal alloy article was re-installed on the wire and immersed in the electrolyte again. A voltage of 19V was applied to the system, and the current was observed to be about 0.03 A. The metal alloy article was left in the solution for one hour. After 1 hour, the current had dropped to 0 A. The solution became clear, and black particles appeared on the bottom. The weight of the wire was 0.544 g and the weight of the metal alloy article was 0.612 g, meaning that neither was substantially corroded during the process. The XRF analysis of the stripped item's surface showed essentially the same composition as after stripping the noble-metal containing layer. The electrolytic solution was analyzed by ICP, showing the following composition: Cu=598.79 mg/L, Ti=0.309 mg/L, Ag=24.275 mg/L, and Au not detected (i.e., less than 0.2126 mg/L).

The changes in concentration of copper and titanium during the additional hour changed very little, suggesting that the electrolytic solution is not corrosive to these metals. The gold particles increased in size, and thus could not pass through the sampling filter; therefore gold was not detected in the electrolytic solution. The concentration of silver diminished as it plated out on the cathode.

The electrolytic solution was filtered, and the solid deposit was recovered and analyzed by XRF. Its composition was: Au=90.0%, Ag=5.83%, Ru=1.82%, Pd=0.72%, Fe=0.48%, Cu=0.39%, Pb=0.36%, Bi=0.2%.

The solid deposit was then subjected to leaching in diluted nitric acid (50 wt %) and the solution was analyzed by ICP to determine the concentration of the leached metals. The remaining solid fraction was dissolved in Aqua Regia (1:3 nitric acid: hydrochloric acid) and the solution was subsequently analyzed. The nitric acid solution contained silver (120.12 mg/L in 63 ml) and a small amount of copper (5.813 mg/L). The Aqua Regia solution contained 1488 mg/L of gold in 45 ml of the solution, which results in 67 mg of recovered gold.

The surface of the cathode was rinsed with 50 wt % of nitric acid and analyzed to determine dissolved metal concentrations. Leaching with nitric acid has shown, that the metal which deposited on the cathode was silver (82.294 mg/L in 82 ml of the solution) and a small amount of copper (2.418 mg/L).

Example 2

This example describes the removal of gold from gold-containing watch cover using electrolytic removal. Prior to treatment, the watch cover was analyzed by XRF, and its elemental composition was determined to be: Cu=50%, Au=33.6%, Zn=11.6%, Ag=4.75%, Pd=0.067%.

The watch cover was cut into 2 parts. One part, weighing 5.043 g was dissolved in Aqua Regia in order to determine the average gold content of the watch cover. ICP analysis showed 49.66 mg/L in 45 ml of Aqua Regia (or 2.235 mg total gold content in the first part of the watch cover), which can be expressed as 0.044 wt %. The second part of the sample, weighing 6.2316 g, was attached with a titanium wire to the positive contact of the direct current source, and served as an anode of the electrolytic removal system. A stainless steel electrode weighting 196.4 g with the dimensions 26×3×0.3 cm was connected to the negative pole and served as a cathode. 150 ml of 70% methanesulfonic acid was added to the 300 ml glass beaker and the solution was stirred at 150 rpm. As in Example 1, gas formation occurred next to the cathode and also around the immersed watch cover. An electrical current of 0.16 A at 18.9V was detected at the beginning of the deplating process, and the current decreasing to 0.01 A within 30 min. The watch cover was then removed from the solution and weighed, showing a weight loss of 0.0393 g. The watch cover was then rinsed with DI water and dissolved in Aqua Regia in order to determine whether any residual gold had not been recovered. The ICP analysis showed a non-detectable concentration of gold (i.e., less than 2.0381 mg/L), showing that substantially all of the gold had been removed from the watch cover.

The electrolytic solution was filtered using cellulose filter paper (having pores of less than 0.45 micrometers), and the solid fraction was recovered. The solid fraction was analyzed using a Hitachi Scanning Electron Microscope TM3000; the concentration of elements in the sample is shown in Table 3. Gold made up 80% of the sample by weight, with silver and copper sulfates making up the balance.

TABLE 3

Elemental composition of the recovered powder.

| Element | Atomic No. | Series | wt % | at % |
|---|---|---|---|---|
| Gold | 79 | M-series | 80.74 | 40.18 |
| Oxygen | 8 | K-series | 6.24 | 38.21 |
| Silver | 47 | L-series | 5.59 | 5.08 |
| Copper | 29 | K-series | 4.08 | 6.29 |
| Sulfur | 16 | K-series | 3.35 | 10.24 |

The solid powder was subsequently dissolved in Aqua Regia in order to determine the total recovered gold value. The ICP analysis showed 56.0164 mg/L of gold in 43 ml of the solution, resulting in 2.409 mg of the recovered gold (or 0.039 wt %), which is close to the 0.044 wt % concentration of the unstripped part of the watch cover. The absence of residual gold in the stripped part of the watch cover demonstrates that substantially all of the gold was recovered in the stripping process.

Example 3

This example describes the removal of gold from a gold-containing watch cover using an electrolytic process. The watch cover, weighing 7.066 g, was cut into two parts. The surface of the watch cover was analyzed by XRF, showing the following elemental composition: Au=60.2%, Cu=16.8%, Ni=16.6%, Zn=6.22%, Fe=0.096%.

One part of the watch (3.1609 g) was used as an anode in the following set-up: the watch cover was attached to the positive pole of a direct current source with a titanium wire. A piece of titanium foil weighing 23.055 g was used as a cathode, and was inserted around the walls of a 600 ml glass beaker. The cathode surface area was approximately 150 cm$^2$. The beaker was filled with 300 ml of sulfuric acid (98%, technical grade) and the acid was stirred with a magnetic bar with the rate of 300 rpm. The current was turned on, and the voltage and the amperage tumblers were turned to maximal values. A current of 0.19 A was applied in constant voltage mode (0.35V). The current increased up to 0.24 A in 9 min, after which the current dropped, reaching 0.06V in 3 hours. The watch cover was removed from the electrolytic cell, washed with DI water, and dried. The solids in the electrolytic solution were recovered using cellulose filter paper having pores smaller than 0.45 micrometers. The weight of the stripped item was 2.7814 g.

The second part of the watch cover, weighting 3.9057 g, was used as the anode in a similar apparatus, except that instead of sulfuric acid, 300 ml of an aqueous solution of methanesulfonic acid (70 wt %) was used. The solution was stirred with a magnetic bar with the rate of 300 rpm. A constant voltage direct current source was chosen in order to keep the same conditions as in the experiment with the sulfuric acid. An initial voltage of 7.5V was applied at 5.36 A current. The current increased, and in 8 min, a current level of 5.64 A was observed. At this point, the power supply was automatically switched to constant current mode. In order to return to a constant voltage mode, a lower voltage of 7.1 V was set up manually, and resulting in a rise in current to the maximum point of 5.65 A. At this point, the unit switched to constant current mode and was brought back again to constant voltage mode manually by decreasing the voltage. The same procedure was repeated for an initial voltage of 6.8V. When the initial voltage was decreased to 6.1V, a current of 4.76 A was applied, and continuously decreased, down to 0.06 A in almost 2 hours. The watch cover was removed from the solution, washed, dried, and weighed. The solids were recovered. The weight of the stripped watch cover was 3.0162 g.

Both treated watch cover parts were dissolved in Aqua Regia in order to determine the amount of the residual gold which remained after stripping. ICP analysis of the solution, in which the item stripped in sulfuric acid was dissolved, showed 8608.99 mg/L of gold in 41 ml of the solution, meaning that, for the sulfuric acid-based treatment, 352.97 mg of gold was not removed from the surface of the watch cover. ICP analysis of the methanesulfonic acid-containing solution showed 59.6077 mg/L of gold in 49 ml of the solution, meaning that only 2.92 mg of gold remained unstripped. The recovered stripped gold from both experiments was also dissolved in Aqua Regia and the solutions were analyzed using ICP to determine the amount of recovered gold. For the sulfuric acid-based process, 81.31 mg of gold was stripped and recovered. For the methanesulfonic acid-based process, 500.27 mg of gold were recovered. The results of the experiments are presented in Table 4.

TABLE 4

Results of stripping karat gold filling in sulfuric acid and in aqueous solution of methanesulfonic acid.

|  | Sulfuric acid, 98 wt % | Methanesulfonic acid, 70 wt % |
|---|---|---|
| Initial weight of the item | 3.1609 g | 3.9057 g |
| Initial current | 0.19 A | 5.36 A |
| Initial voltage | 0.35 V | 7.5 V |
| Final current | 0.06 A | 0.06 A |
| Duration | 180 min | 110 min |
| Recovered gold | 81.3 mg | 500.3 mg |
| Non-recovered gold | 353.0 mg | 2.9 mg |

Example 4

This example describes the removal of gold from a gold-containing watch using a sodium persulfate-based solution. A piece of a gold-containing watch weighing 1.7892 g was analyzed by XRF. The watch had the following concentration of elements on its surface: Cu=42.4%, Au=39.8%, Zn=8.69, Ag=7.17%, Ni=1.90%.

The electrolytic solution was made by dissolving 20 g of sodium persulfate in 150 ml of water.

The watch was immersed in the electrolytic solution and used as an anode. A piece of stainless steel weighing 196.4 g and having dimensions of 26×3×0.3 cm served as a cathode. The electrolyte was stirred at 150 rpm. A current of 5.66 A and a voltage of 9.5V were registered at the beginning of the electrolytic stripping process. A purple powder was formed in the solution during the first three minutes, indicating the stripping of gold. With time, the solution heated up and became blue in color, which indicated that copper was being dissolved. A black powder became visible in the solution. The current was kept in constant current mode, and the voltage decreased to 5.6V in 20 min. After 26 min (from the beginning of the process), the voltage increased to 6.1 V, and the process was stopped. The solids were collected by filtration. It was noticed that the part of the recovered solids looked like the gold metal powder recovered in the previous examples (i.e., it had been oxidized and reduced), and another part of the gold metal powder looked like the original gold filling. It is believed that the gold that looked like the original gold filling had not been oxidized and reduced, but rather, had been undercut and detached from the underlying substrate as a result of the dissolution of the underlying base metals. XRF analysis of the recovered powder gave the following elemental composition: Au=61.6%, Cu=14.4%, Ag=9.94%, Ni=9.37%, Ru=1.51%, Pd=1.13%, Sb=0.71%, Cd=0.48%, In=0.33%.

The weight of the base metals substrate was found to be 0.8823 g.

Example 5

This example describes the removal of silver from a silver-plated copper wire using a methanesulfonic acid-based electrolytic solution. The surface of the silver plated copper wire (weighing 1.4583 g) was analyzed by XRF, and the following metal concentrations were observed: Ag=84.1%, Cu=8.22%, Ni=5.31%, W=1.16%, Fe=0.68%.

The plated wire was connected to the positive contact of a direct current source using a titanium wire and immersed into a 300 ml glass beaker, which was filled with 100 ml of methanesulfonic acid (70 wt %) electrolytic solution. The electrolytic solution was stirred at 250 rpm. A piece of titanium foil weighing 23.055 g with a surface area of 150 cm$^2$ was used as a cathode. The electric current was turned on, and a current of 0.12 A at 18.9 V was delivered. The current rose to 0.32 A during the first 5 min, and started to diminish after this point. The current dropped to 0.01 A during the following 20 min and the process was stopped. During the stripping, the solution became grey (and later dark-grey) due to silver particles detaching from the wire and dispersing in the solution. The wire was removed from the solution and rinsed with DI water. The wire had the rose-orange color normally associated with copper metal. The weight of the stripped copper wire was 1.3617 g. The surface of the copper wire was analyzed by XRF, and only copper was detected (i.e., Cu=99.9%).

The electrolytic solution was filtered using cellulose filter paper with pores of less than 45 micrometers. The recovered solids were dissolved in 50% wt nitric acid and filtered. The solids remaining after the nitric acid dissolution step were dissolved in Aqua Regia. Both solutions were analyzed by ICP. The solids dissolved in nitric acid were found to contain mostly silver (258.35 mg/L) and small amounts of the base metals (Cu=3.559 mg/L and Ti=0.650 mg/L). The Aqua Regia solution contained Au=57.383 mg/L, Cu=5.960 mg/L, Fe=1.839 mg/L, and Ni=1.013 mg/L. 0.382 mg of silver were recovered on the cathode. The electrolytic solution was analyzed by ICP and showed the following concentrations of metals: Ag=121.32 mg/L, Ni=232.27 mg/L, Cu=89.867 mg/L, and Sn=381.38 mg/L.

In total, 33.17 mg of silver and 1.78 mg of gold were stripped from the silver plated wire.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/ or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for recovering noble metal from a noble-metal-containing material, comprising:
an electrode;
a noble-metal-containing material; and
an electrolytic solution comprising a sulfonic acid and/or persulfuric acid,
wherein the system is configured such that, when an electric current is transported between the electrode and the noble metal, at least a portion of the noble metal is removed from the noble-metal-containing material;
wherein the electrolytic solution comprises a mixture of acid and water and has a water content of less than or equal to 30 weight percent; and
wherein the electrolytic solution is free of supplemental noble metal oxidant or supplemental noble metal oxidant is present in an amount of less than 0.1 wt % of the electrolytic solution.

2. The system of claim 1, wherein the electrolytic solution comprises a sulfonic acid.

3. The system of claim 1, wherein the electrolytic solution comprises persulfuric acid.

4. The system of claim 1, wherein the electrolytic solution comprises at least one sulfonic acid represented by:

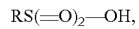

wherein R is an alkyl group containing 1-12 carbon atoms, an alkenyl group containing 1-12 carbon atoms, a hydroxyalkyl group containing 1-12 carbon atoms, or an aryl group containing 6-12 carbon atoms.

5. The system of claim 1, wherein the electrolytic solution comprises an alkanesulfonic acid comprising an alkyl group containing 1-5 carbon atoms.

6. The system of claim 1, wherein the electrolytic solution comprises methanesulfonic acid.

7. The system of claim 1, wherein the electrolytic solution comprises a peroxymonosulfate ion ($SO_5^{2-}$) and/or a peroxydisulfate ion ($S_2O_8^{2-}$).

8. The system of claim 1, wherein the system is configured such that, when an electric current is transported between the electrode and the noble metal, an oxidizing agent is generated at or near the noble-metal-containing material.

9. The system of claim 8, wherein the system is configured such that, when the oxidizing agent is generated at or near the noble-metal-containing material, the oxidizing agent oxidizes and/or dissolves at least a portion of the noble metal.

10. The system of claim 8, wherein the oxidizing agent comprises peroxymonosulfuric acid, peroxydisulfuric acid, and/or hydrogen peroxide.

11. The system of claim 1, wherein:
the system is configured such that, when an electric current is transported between the electrode and the noble metal, peroxymonosulfuric acid and/or peroxydisulfuric acid is generated by electrolysis of the electrolytic solution.

12. The system of claim 1, wherein the system is configured such that, when an electric current is transported between the electrode and the noble metal, at least a portion of the noble metal is chemically reduced to form a noble-metal-containing product.

13. The system of claim 12, wherein the system is configured such that, when an electric current is transported between the electrode and the noble metal, the noble-metal-containing product, or a precursor thereof, is transported away from the noble-metal-containing material.

14. The system of claim 1, comprising a separator configured to at least partially separate elemental noble metal from the electrolytic solution.

15. The system of claim 1, wherein the system is configured such that, when an electric current is transported between the electrode and the noble metal, a noble-metal-containing product is recovered as a salt of an acid contained in the electrolytic solution.

16. The system of claim 1, wherein the electrolytic solution comprises at least one sulfonic acid, and the total amount of sulfonic acid(s) in the electrolytic solution is greater than or equal to 50 wt %.

17. The system of claim 1, wherein the electrolytic solution comprises at least one sulfonic acid, and the total amount of sulfonic acid(s) in the electrolytic solution is greater than or equal to 70 wt %.

18. A method for recovering a noble metal from a noble-metal-containing material, comprising:
transporting an electric current between an electrode and a noble metal of the noble-metal-containing material positioned within an electrolytic solution comprising a sulfonic acid and/or persulfuric acid such that at least a portion of the noble metal is removed from the noble-metal-containing material,
wherein the electrolytic solution comprises a mixture of acid and water and has a water content of less than or equal to 30 weight percent, and
wherein the electrolytic solution is free of supplemental noble metal oxidant or supplemental noble metal oxidant is present in an amount of less than 0.1 wt % of the electrolytic solution.

19. The method of claim 18, wherein the electrolytic solution comprises a sulfonic acid.

20. The method of claim 18, wherein the electrolytic solution comprises persulfuric acid.

21. The method of claim 18, wherein the electrolytic solution comprises at least one sulfonic acid represented by:

$$RS(=O)_2-OH,$$

wherein R is an alkyl group containing 1-12 carbon atoms, an alkenyl group containing 1-12 carbon atoms, a hydroxyalkyl group containing 1-12 carbon atoms, or an aryl group containing 6-12 carbon atoms.

22. The method of claim 18, wherein the electrolytic solution comprises an alkanesulfonic acid comprising an alkyl group containing 1-5 carbon atoms.

23. The method of claim 18, wherein the electrolytic solution comprises methanesulfonic acid.

24. The method of claim 18, wherein transporting the electric current between the electrode and the noble metal generates an oxidizing agent at or near the noble-metal-containing material.

25. The method of claim 24, wherein the oxidizing agent oxidizes and/or dissolves at least a portion of the noble metal.

26. The method of claim 18, wherein the electrolytic solution comprises at least one sulfonic acid, and the total amount of sulfonic acid(s) in the electrolytic solution is greater than or equal to 50 wt %.

27. The method of claim 18, wherein the electrolytic solution comprises at least one sulfonic acid, and the total amount of sulfonic acid(s) in the electrolytic solution is greater than or equal to 70 wt %.

* * * * *